United States Patent
Behling et al.

(10) Patent No.: US 10,941,321 B2
(45) Date of Patent: Mar. 9, 2021

(54) CURABLE AND CURED ADHESIVE COMPOSITIONS

(71) Applicant: 3M INNOVATIVE PROPERTIES COMPANY, St. Paul, MN (US)

(72) Inventors: Ross E. Behling, Woodbury, MN (US); Jason D. Clapper, Lino Lakes, MN (US); Albert I. Everaerts, Tucson, AZ (US); Chun-Yi Ting, Taoyuan (TW); Mark F. Ellis, St. Paul, MN (US); Karl E. Benson, St. Paul, MN (US); Jianhui Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 126 days.

(21) Appl. No.: 15/761,997

(22) PCT Filed: Sep. 12, 2016

(86) PCT No.: PCT/US2016/051223
§ 371 (c)(1),
(2) Date: Mar. 21, 2018

(87) PCT Pub. No.: WO2017/058499
PCT Pub. Date: Apr. 6, 2017

(65) Prior Publication Data
US 2018/0265748 A1  Sep. 20, 2018

Related U.S. Application Data

(60) Provisional application No. 62/235,152, filed on Sep. 30, 2015.

(51) Int. Cl.
| | |
|---|---|
| *C09J 7/38* | (2018.01) |
| *C08F 265/04* | (2006.01) |
| *C09J 7/40* | (2018.01) |
| *C08F 220/18* | (2006.01) |
| *C08J 3/24* | (2006.01) |

(52) U.S. Cl.
CPC ............ *C09J 7/385* (2018.01); *C08F 220/18* (2013.01); *C08F 265/04* (2013.01); *C08J 3/24* (2013.01); *C09J 7/405* (2018.01); *C08F 220/1804* (2020.02); *C08F 220/1806* (2020.02); *C08F 220/1808* (2020.02); *C08F 220/1818* (2020.02); *C08F 2810/20* (2013.01); *C08J 2333/10* (2013.01); *C09J 2203/326* (2013.01); *C09J 2301/414* (2020.08); *C09J 2433/00* (2013.01); *Y10T 428/2891* (2015.01)

(58) Field of Classification Search
CPC ............ C09J 7/385; C09J 7/405; C08F 220/18
See application file for complete search history.

(56) References Cited

U.S. PATENT DOCUMENTS

| | | |
|---|---|---|
| 4,619,979 A | 10/1986 | Kotnour |
| 4,843,134 A | 6/1989 | Kotnour |
| 4,912,169 A | 3/1990 | Whitmire |
| 5,385,736 A | 1/1995 | Kappes |
| 5,637,646 A | 6/1997 | Ellis |
| 5,804,610 A | 9/1998 | Hamer |
| 5,986,011 A | 11/1999 | Ellis |
| 6,448,339 B1 | 9/2002 | Tomita |
| 6,783,850 B2 | 8/2004 | Takizawa |
| 6,878,775 B2 | 4/2005 | Husemann |
| 6,939,911 B2 | 9/2005 | Tosaki |
| 7,838,110 B2 | 11/2010 | Zhu |
| 8,137,807 B2 | 3/2012 | Clapper |
| 8,945,710 B2 | 2/2015 | Kishioka |
| 10,287,463 B2 | 5/2019 | Behling |
| 2012/0328800 A1* | 12/2012 | Yoon .................... C09J 133/062 428/1.55 |
| 2012/0328873 A1 | 12/2012 | Kishioka |
| 2012/0328891 A1* | 12/2012 | Suwa ..................... C09J 133/08 428/522 |
| 2013/0211028 A1 | 8/2013 | Shinike |
| 2013/0260149 A1 | 10/2013 | Clapper |
| 2016/0289513 A1* | 10/2016 | Behling ................. C09J 133/10 |

FOREIGN PATENT DOCUMENTS

| | | |
|---|---|---|
| CN | 101649165 | 2/2010 |
| CN | 102304333 | 1/2012 |
| CN | 102352165 | 2/2012 |
| CN | 102924650 | 2/2013 |

(Continued)

OTHER PUBLICATIONS

Temel, "Photopolymerization and Photophysical Properties of Amine Linked Benzophenone Photoinitiator for Free Radical Polymerization", Journal of Photochemistry and Photobiology A: Chemistry, 2011, vol. 219, pp. 26-31.

(Continued)

*Primary Examiner* — Anish P Desai
(74) *Attorney, Agent, or Firm* — Jean A. Lown

(57) ABSTRACT

Curable adhesive compositions are provided that can be cured using ultraviolet or visible light radiation. These curable adhesive compositions, which contain a curable (meth)acrylate copolymer, have a creep compliance that is less than $5(10^{-4})$ inverse Pascals at 25° C., a creep compliance that is greater than $1(10^{-3})$ inverse Pascals at 70° C., and a shear storage modulus greater than 40 kiloPascals when measured at 25° C. at a frequency of 1 radian/second.

14 Claims, 1 Drawing Sheet

(56) References Cited

FOREIGN PATENT DOCUMENTS

| | | |
|---|---|---|
| CN | 104797672 | 7/2015 |
| JP | H08-109356 A | 4/1996 |
| JP | 5842825 | 1/2016 |
| KR | 2002-0072653 | 9/2002 |
| WO | WO 2010/040014 | 4/2010 |
| WO | WO 2011/111576 | 9/2011 |
| WO | WO 2011/119363 | 9/2011 |
| WO | WO 2012/077807 | 6/2012 |
| WO | WO 2013/025443 | 2/2013 |
| WO | WO 2013/181133 | 12/2013 |
| WO | WO 2014/078115 | 5/2014 |
| WO | WO 2014/078123 | 5/2014 |
| WO | WO 2014/078260 | 5/2014 |
| WO | WO 2014/167890 | 10/2014 |

OTHER PUBLICATIONS

International Search Report for PCT International Application No. PCT/US2016/051223, dated Nov. 8, 2016, 5 pages.

* cited by examiner

CURABLE AND CURED ADHESIVE COMPOSITIONS

CROSS REFERENCE TO RELATED APPLICATION

This application is a national stage filing under 35 U.S.C. 371 of PCT/US2016/051223, filed Sep. 12, 2016, which claims the benefit of U.S. Provisional Application No. 62/235,152, filed Sep. 30, 2015, the disclosure of which is incorporated by reference in its/their entirety herein.

TECHNICAL FIELD

Curable adhesive compositions, cured adhesive compositions, articles containing the curable and cured adhesive compositions, and method of making the articles are provided.

BACKGROUND

There is a high demand for new optically clear adhesives (OCA) for gap filling between an outer cover lens or sheet (e.g., such as those based on glass, polyethylene terephthalate, polycarbonate, poly(methyl methacrylate), cyclic olefin copolymer, and the like) and an underlying display module of an electronic display assembly. The presence of the OCA improves the performance of the display by reducing the refractive index mismatch between substrates and the air gap while also providing structural support to the assembly. Filling the gap with an index matching adhesive reduces sunlight and ambient light reflections inherent in the use of multi-layered display panels; as a result, contrast and brightness of conventional display panels are improved.

During the manufacture of certain display devices two rigid substrates, such as a liquid crystal display (LCD) and a glass or polycarbonate cover lens, must be optically coupled by the OCA. In many cases, a capacitive touch sensor is also introduced between the LCD and the cover lens. One or more layers of OCA, either as a liquid optically clear adhesive (LOCA) or as an optically clear adhesive film (e.g., a die-cut film, which can be referred to as a contrast enhancement film (CEF)) can be used to assemble the top layers of the display module.

Newer display devices have been using film based touch sensors instead of the original glass based sensors. These film based touch sensors are much more compliant and thus susceptible to deformation during assembly. When such deformation is significant and permanent, an optical defect known as bright line can be present and the assemblers go to great lengths to eliminate it. In addition, defects such as patterns or creases introduced during the laminating process that also generate stress and uneven pressures on the LCD can cause unacceptable image distortions. These distortions are often referred to as "Mura".

On the lens side, the OCAs typically also have to be able to completely fill in the sharper corners of the decorative ink-steps. Liquid optically clear adhesives (LOCAs) can cover ink-steps extremely well, but gap uniformity, curing shrinkage, and spillage have to be managed during assembly. In contrast, film-like OCAs, such as CEF, have very good caliper control and are easy to apply, but they may lack sufficient flow to cover the higher ink-steps, be compliant enough against the LCD to avoid Mura, and/or show sufficient leveling to avoid distortion of plastic touch sensors.

The original film OCAs easily filled the ink-step gap and, after some work, were able to conform to a low black ink-step (about 25 micrometers). As higher white ink-steps (about 70 micrometers) were introduced, a new generation of OCA films was introduced with the viscoelastic balance being shifted towards more viscous character. This new generation of OCAs also had much lower crosslink density, so the OCAs retained significant flow to efficiently cover the ink-step. In order to make the assembly durable to environmental exposure, these OCAs also were crosslinked using ultraviolet or visible light radiation after the autoclave step (which provides heat and time under pressure to allow adhesive flow).

The current trend is towards thinner mobile devices that are being manufactured using ink printed cover glass with a larger white ink-step (about 70 micrometers). The current UV curable OCAs cannot conform to the larger ink-steps unless they are thick and heavy. That is, the thickness of the OCA often must be 3 to 4 times the thickness of the ink-step height (i.e., the current OCA can cover features that are 33 to 25 percent of its thickness).

SUMMARY

Curable adhesive compositions are provided that can be cured using ultraviolet or visible light radiation. These curable adhesive compositions have desirable flow characteristics for use in a variety of applications, particularly in electronic display devices. Significantly, a layer (e.g., a film) of the curable adhesive compositions can flow to cover features (e.g., ink-steps) on a substrate having a height up to 100 percent of its thickness. Advantageously, die-cut film layers of the curable adhesive can remain dimensionally stable when stored and shipped at temperatures up to 40° C. (e.g., temperatures close to room temperature and up to 40° C.). That is, the die-cut film layers can be stored and transported without freezing and without refrigeration.

In a first aspect, a curable adhesive composition is provided that contains (1) a curable (meth)acrylate copolymer having a weight average molecular weight (Mw) in a range of 100,000 to 400,000 Daltons (Da) and (2) an optional photoinitiator. The curable (meth)acrylate copolymer includes a first monomeric unit of Formula (I) in an amount in a range of 50 to 94 weight percent based on a total weight of monomeric units in the curable (meth)acrylate copolymer.

In Formula (I), $R_1$ is hydrogen or methyl and $R_2$ is an alkyl, heteroalkyl, aryl, aralkyl, or alkaryl group. The curable (meth)acrylate copolymer further includes a second monomeric unit of Formula (II) in an amount in a range of 6 to 10 weight percent based on the total weight of monomeric units in the curable (meth)acrylate copolymer.

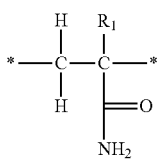
(II)

Group $R_1$ is the same as defined above for Formula (I). The curable (meth)acrylate copolymer still further comprises a third monomeric unit of Formula (III) in an amount in a range of 0.05 to 5 weight percent based on the total weight of monomeric units of the curable (meth)acrylate copolymer.

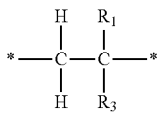
(III)

In Formula (III), group $R_1$ is the same as defined above and group $R_3$ comprises 1) an aromatic ketone group that causes hydrogen abstraction from a polymeric chain when exposed to ultraviolet radiation or 2) a (meth)acryloyl group that undergoes free radical polymerization when exposed to ultraviolet or visible light radiation in the presence of the photoinitiator. The curable (meth)acrylate copolymer yet further comprises an optional fourth monomeric unit of Formula (IV) in an amount in a range of 0 to 20 weight percent based on the total weight of monomeric units of the curable (meth)acrylate copolymer.

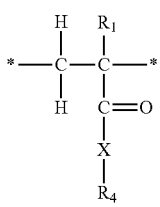
(IV)

In Formula (IV), group $R_1$ is the same as defined above, group X is —O— or —NH—, and group $R_4$ is a hydroxy-substituted alkyl or hydroxy-substituted heteroalkyl. The asterisk (*) in the various formulas indicates a site of attachment to another monomeric unit or to a terminal group. The curable adhesive composition has a creep compliance that is less than $5(10^{-4})$ inverse Pascals (Pa) at 25° C. and a creep compliance that is greater than $1(10^{-3})$ inverse Pascals (Pa) at 70° C. The curable adhesive composition has a shear storage modulus equal to at least 40 kiloPascals (kPa) when measured at 25° C. and 1 radian/second.

In a second aspect, a cured adhesive composition comprising a cured (meth)acrylate copolymer is provided. The cured adhesive composition is a reaction product resulting from exposing a curable adhesive composition to ultraviolet or visible light radiation. The curable adhesive composition is the same as described above in the first aspect.

In a third aspect, an article is provided that comprises a first substrate and a layer of a curable adhesive composition positioned adjacent to (e.g., laminated to) the first substrate. The curable adhesive composition comprises (1) a curable (meth)acrylate copolymer and (2) an optional photoinitiator and is the same as described above in the first aspect. In many embodiments, the layer of the curable adhesive composition is positioned between a first substrate and a second substrate (e.g., the layer of the adhesive composition is laminated to both the first and second substrate).

In a fourth aspect, an article is provided that comprises a first substrate, a second substrate, and a layer of a cured adhesive composition positioned between the first substrate and the second substrate (e.g., a layer of the cured adhesive composition is laminated to both the first substrate and the second substrate). The cured adhesive composition comprises a cured (meth)acrylate copolymer that is the same as described above in the second aspect.

In a fifth aspect, a method of preparing an article is provided. The method comprises providing a first substrate, a second substrate, and a layer of a curable adhesive composition layer. The curable adhesive composition comprises a curable (meth)acrylate copolymer plus an optional photoinitiator and is the same as described above in the first aspect. The method further comprises forming a laminate comprising the first substrate, the second substrate, and the layer of the curable adhesive composition, wherein the layer of the curable adhesive composition is positioned between the first substrate and the second substrate. The method still further comprises exposing the layer of the curable adhesive composition to ultraviolet or visible light radiation to form a layer of a cured adhesive composition.

The above summary of the present disclosure is not intended to describe each disclosed embodiment or every implementation of the present disclosure. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION

Figure 1:
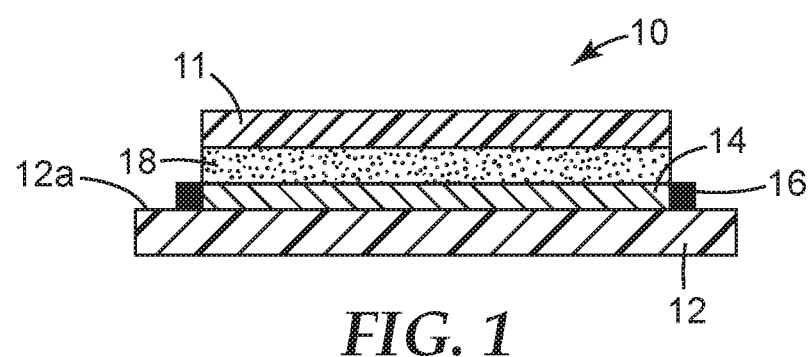
FIG. 1 is a cross-sectional view of an exemplary article according to the present disclosure.

New curable and cured adhesive compositions are needed that can be used, for example, in various electronic display assemblies. In particular, curable adhesive compositions are needed that are optically clear, that are in the form of a layer (e.g., film) that can be cut with a die (die cut), that can retain the precise dimensions of the die-cut during storage and transport without refrigeration or freezing, and that have sufficient flow when subjected to autoclave temperatures (e.g., temperatures in a range of 40° C. to 80° C.) to cover large ink-steps or other features (up to about 70 micrometers, up to 80 micrometers, up to 90 micrometers, or up to 100 micrometers or even higher) present on a substrate to which it is laminated. Although flow is important to cover the ink-steps and other features, the amount of flow must be carefully controlled so that the adhesive composition does not cover other components of the electronic display assemblies that need to remain free of adhesive. That is, boundary control is becoming more important as the ink border and bezel dimensions of the electronic display assemblies continue to decrease.

Further, for use in electronic display assemblies, the adhesive compositions typically need to be acid free or substantially acid free (less than 0.1 weight percent, less than 0.05 weight percent, less than 0.01 weight percent, or less than 0.005 weight percent acidic groups based on the total weight of the adhesive) so that corrosion of various metal-containing components such as indium tin oxide or metals traces like copper does not occur. Examples of acidic groups are carboxylic acid groups, phosphonic acid groups, and sulfonic acid groups.

Curable adhesive compositions are provided that can be in the form of a layer (e.g., film), that can be optically clear, that can have minimal or no acidic groups, that can be dimensionally stable for extended periods at temperatures close to room temperature (e.g., that can be die-cut to a desired size and shape and retain that size and shape for extended periods at temperatures close to room temperature), and that can flow sufficiently but not excessively during lamination and autoclaving to cover various features (e.g., ink-steps) that may be present on a substrate(s) to which it is joined.

In many embodiments, the adhesive compositions are pressure-sensitive adhesive compositions. According to the Pressure-Sensitive Tape Council, pressure-sensitive adhesives (PSAs) are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature. Materials that are merely sticky or adhere to a surface do not constitute a PSA; the term PSA encompasses materials with additional viscoelastic properties. PSAs are adhesives that satisfy the Dahlquist criteria for tackiness, which means that the shear storage modulus is typically $3 \times 10^5$ Pa (300 kPa) or less when measured at 25° C. and 1 Hertz (6.28 radians/second). PSAs typically exhibit adhesion, cohesion, compliance, and elasticity at room temperature.

The term "adhesive composition" can refer herein to an adhesive that contains a curable (meth)acrylate copolymer and/or a cured (meth)acrylate copolymer. In many embodiments, the adhesive composition is a pressure-sensitive adhesive composition.

As used herein, terms as "a," "an," and "the" are not intended to refer to only a singular entity, but include the general class of which a specific example may be used for illustration. These terms can be used interchangeably with the term "at least one."

As used herein, the term "room temperature" refers to a temperature of about 20° C. to about 25° C. or about 22° C. to about 25° C.

The term "and/or" means one or all of the listed elements or a combination of any two or more of the listed elements.

The phrase "in a range of" or a similar phrase refers to all values within the stated range plus the endpoints of the range.

The term "(meth)acryloyl" refers to a group of formula $H_2C=CR_1-(CO)-$ where $R_1$ is hydrogen or methyl. That is, the (meth)acryloyl group is an acryloyl group (where $R_1$ is hydrogen) and/or a methacryloyl group (where $R_1$ is methyl). The (meth)acryloyl group is often a (meth)acryloyloxy group of formula $H_2C=CR_1-(CO)-O-$ or a (meth)acryloylamido group of formula $H_2C=CR_1-(CO)-NH-$.

The term "(meth)acrylate copolymer" refers to a polymeric material formed from two or more monomers (e.g., three or more monomers), wherein the majority (at least 50 weight percent, at least 60 weight percent, at least 70 weight percent, at least 80 weight percent, or at least 90 weight percent) of the monomers used to form the copolymer are (meth)acrylates (e.g., alkyl (meth)acrylates, aryl (meth)acrylates, aralkyl (meth)acrylates, alkaryl (meth)acrylates, and heteroalkyl (meth) acrylate). The term (meth)acrylates includes methacrylates, acrylates, or both. The term (meth)acrylate copolymer can apply herein to the precursor (meth)acrylate copolymer, and/or a curable (meth)acrylate copolymer, and/or a cured (meth)acrylate copolymer.

As used herein, the term "precursor (meth)acrylate copolymer" refers to a (meth)acrylate copolymer that does not contain the third monomeric units of Formula (III) but that can be reacted with an unsaturated reagent compound to form a curable (meth)acrylate copolymer. That is, the precursor (meth)acrylate copolymer can be converted to a curable (meth)acrylate copolymer having a pendant (meth) acryloyl group, which is the second type of third monomeric unit of Formula (III).

As used herein, the term "curable (meth)acrylate copolymer" refers to a (meth)acrylate copolymer that has third monomeric units of Formula (III) in addition to the first monomeric units of Formula (I) and the second monomeric units of Formula (II). The third monomeric units of Formula (III) can be of the first type (having an aromatic ketone group), of the second type (having a pendant (meth)acryloyl group), or both. The third monomeric units can undergo reaction when exposed to ultraviolet radiation (or to ultraviolet or visible light radiation in the presence of a photoinitiator). When the third monomeric units react to form a cured (meth)acrylate copolymer, covalent bonds are formed between different polymeric chains or within the same polymeric chain. This reaction typically increases the weight average molecular weight of the (meth)acrylate copolymer.

As used herein, the term "cured (meth)acrylate copolymer" refers to a (meth)acrylate copolymer resulting from the exposure of the curable (meth)acrylate copolymer to ultraviolet radiation (or to ultraviolet or visible light radiation in the presence a photoinitiator). In some embodiments, the material is considered cured when at least 50 weight percent (e.g., at least 60 weight percent, at least 70 weight percent, at least 80 weight percent, at least 90 weight percent, or at least 95 weight percent) of groups of Formula (III) have reacted to form a crosslinked site.

As used herein, the term "feature" refers to a structure projecting in the z-direction (i.e., the z-direction corresponds to the height of the structure) from a base of the substrate. The features can have any shape but are often in the form of steps such as steps resulting from printing various components on the substrate. That is, in some embodiments, the features are printed ink-steps. The feature often has a height, for example, extending up to 100 micrometers or more, up to 80 micrometers, up to 70 micrometers, up to 60 micrometers, up to 40 micrometers, up to 20 micrometers, or up to 10 micrometers from the base of the substrate.

As used herein, in reference to an adhesive layer, the term "dimensional stability" refers to the ability of a die-cut film sample to retain its originally cut length, width, and height within 0.5 millimeters, within 0.30 millimeters, or within 0.15 millimeters when stored at 25° C. for one week as a single die-cut (i.e., not a stack of die-cuts where position in the stack and the method of stacking can influence the dimensional stability).

In many embodiments, particularly when the adhesive composition is used in an electronic display assembly, optical clarity of both the (meth)acrylate copolymer and the adhesive composition are desirable. As used herein, "optically clear" or "optical clarity" means that a material (in a 50 micron thick layer) has an optical transmission value of at least 85 percent, preferably at least 90 percent. The term "optical transmission value" refers to the percentage of light that is not reflected back toward the source as a percentage of the total incident light in the visible region of the electromagnetic spectrum (i.e., the optical transmission value is equal to [(light intensity emitted/light intensity source)×100] at a wavelength of 400 nanometers (nm) to 700 nm). These optically clear materials also have (as measured in a 50 micron thick layer) a haze value that is less than 2 percent and a close to color neutral on the CIE Lab color scale. Close to color neutral means that any of the a* or b* values are less than 0.5.

The terms "die-cut layer", "die-cut film", and "die-cut film layer" are used interchangeably and refer to a layer of an adhesive layer, which is typically a curable adhesive layer, that has been cut to a desired shape using a die.

Adhesive compositions are provided that contain a curable (meth)acrylate copolymer or a cured (meth)acrylate copolymer. These adhesive compositions can be in the form of a layer or film. If desired, the layer or film can be die cut (i.e., cut with a die) to any desired size and shape (e.g., the size and shape can be for use in an electronic display assembly). The layer or film of the adhesive composition that contains a curable (meth)acrylate copolymer can be referred to as a curable adhesive composition. The curable (meth)acrylate copolymer within the curable adhesive composition can be cured by exposure to ultraviolet radiation (or in some embodiments, by exposure to ultraviolet or visible light radiation in the presence of a photoinitiator). The resulting adhesive, which contains a cured (meth)acrylate copolymer, can be referred to as a cured adhesive composition. In many embodiments, both the curable and cured adhesive compositions are pressure-sensitive adhesive compositions.

The curable (meth)acrylate copolymer includes at least three different types of monomeric units: first monomeric units of Formula (I), second monomeric units of Formula (II), and third monomeric units of Formula (III). In some embodiments, the curable (meth)acrylate copolymer includes optional fourth monomeric units of Formula (IV). Still other optional monomeric units can be included in the curable (meth)acrylate copolymer. Depending on the selection of the third monomeric unit, which includes the group responsible for curing the (meth)acrylate copolymer, the curable (meth)acrylate copolymer can be formed directly from a polymerizable composition containing the corresponding first monomer, second monomer, third monomer, and other optional monomers. In some embodiments, particularly for curable (meth)acrylate copolymers having a pendant (meth)acryloyl group, a precursor (meth)acrylate copolymer is initially prepared and then further reacted with an unsaturated reagent compound to form the third monomeric unit (having a pendant (meth)acryloyl group) and the resulting curable (meth)acrylate copolymer.

Stated differently, some curable (meth)acrylate copolymers are formed from precursor (meth)acrylate copolymers while other curable (meth)acrylate copolymers are formed directly from its constituent monomers. The precursor (meth)acrylate copolymer does not have a third monomeric unit of Formula (III) but has a group in a fourth monomeric unit of Formula (IV) that can be further reacted to form the second type of third monomeric unit of Formula (III) having a (meth)acryloyl group. The precursor (meth)acrylate includes the first monomeric units of Formula (I) and the second monomeric units of Formula (II). The curable (meth)acrylate copolymer formed from the precursor (meth)acrylate copolymer has a third monomeric unit of Formula (III) with a pendant (meth)acryloyl group. The cured (meth)acrylate copolymer is formed by exposing the curable (meth)acrylate copolymer to ultraviolet radiation or by exposing the curable (meth)acrylate copolymer to ultraviolet or visible light radiation in the presence of a photoinitiator.

Alternatively, a curable (meth)acrylate copolymer can have a first type of third monomeric units of Formula (III) (with an aromatic ketone group) plus a group in a fourth monomeric unit of Formula (IV) that can be further reacted to form the second type of third monomeric unit of Formula (III) (with a pendant (meth)acryloyl group). Such a curable (meth)acrylate copolymer has both the first type of monomeric unit of Formula (III) and the second type of monomeric unit of Formula (III).

The curable (meth)acrylate copolymer includes a first monomeric unit of Formula (I) in an amount in a range of 50 to 94 weight percent based on a total weight of monomeric units in the curable (meth)acrylate copolymer.

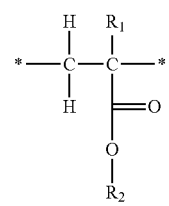

(I)

In Formula (I), $R_1$ is hydrogen or methyl and $R_2$ is an alkyl, heteroalkyl, aryl, aralkyl, or alkaryl group. Stated differently, the first monomeric unit is derived from an alkyl (meth)acrylate, heteroalkyl (meth)acrylate, aryl (meth)acrylate, aralkyl (meth)acrylate, alkaryl (meth)acrylate, or a mixture thereof (i.e., the (meth)acrylate copolymer can be have multiple first monomeric units with different $R_2$ groups). Suitable alkyl $R_2$ groups often have 1 to 32 carbon atoms, 1 to 24 carbon atoms, 1 to 18 carbon atoms, 1 to 16 carbon atoms, 1 to 12 carbon atoms, 1 to 10 carbon atoms, 1 to 8 carbon atoms, 1 to 6 carbon atoms, or 1 to 4 carbon atoms. The alkyl groups can be linear, branched, cyclic, or a combination thereof. Suitable heteroalkyl $R^2$ groups often have 1 to 30 carbon atoms or more and 1 to 20 carbon atoms or more, 1 to 20 carbon atoms and 1 to 10 heteroatoms, 1 to 16 carbon atoms and 1 to 8 heteroatoms, 1 to 12 carbon atoms and 1 to 6 heteroatoms, or 1 to 10 carbon atoms and 1 to 5 heteroatoms. The heteroatoms are often oxygen (oxy groups) but can be sulfur (—S— groups) or nitrogen (—NH— groups). Suitable aryl $R_2$ groups typically are carbocyclic aromatic groups. The aryl group often has 6 to 12 carbon atoms or 6 to 10 carbon atoms. In many embodiments, the aryl is phenyl. Suitable aralkyl groups are of formula —R—Ar where R is an alkylene and Ar is an aryl. The alkylene groups, which are a divalent radical of an alkane, typically have 1 to 10 carbon atoms, 1 to 6 carbon atoms, or 1 to 4 carbon atoms and the aryl group typically has 6 to 12 carbon atoms, 6 to 10 carbon atoms, or 6 carbon atoms. In many embodiments, the aryl is phenyl. Suitable alkaryl groups are of formula —Ar—R wherein Ar is an arylene (i.e., a divalent radical of a carbocyclic aromatic compound) and R is an alkyl. The arylene typically has 6 to 12 carbon atoms, 6 to 10 carbon atoms, or 6 carbon atoms. In many embodiments, the arylene is phenylene. The alkyl group of the alkaryl group is the same as described above for alkyl groups but often has 1 to 10 carbon atoms, 1 to 6 carbon atoms, or 1 to 4 carbon atoms.

The $R_2$ group in Formula (I) often is an alkyl. Stated differently, the first monomeric unit is often derived from (i.e., formed from) an alkyl (meth)acrylate. Exemplary alkyl (meth)acrylates often include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isoamyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, n-nonyl (meth)acrylate, isononyl (meth)acrylate, isobornyl (meth)acrylate), adamantyl (meth)acrylate, n-decyl (meth)acrylate, isodecyl (meth)acrylate, 2-propylheptyl (meth)acrylate, isotridecyl (meth)acrylate, isostearyl (meth)acrylate, octadecyl (meth) acrylate, 2-octyldecyl (meth)acrylate, dodecyl (meth)acrylate, lauryl (meth)acrylate, and heptadecanyl (meth)acrylate. Some other exemplary branched alkyl (meth)acrylates are (meth)acrylic acid esters of Guerbet alcohols having 12 to 32 carbon atoms as described in PCT Patent Application Publication WO 2011/119363 (Clapper et al.). In some embodiments, the alkyl (meth)acrylate is chosen that has an alkyl group with no greater than 8 carbon atoms. These alkyl (meth)acrylate often have a higher solubility parameter compared to those having an alkyl group with greater than 8 carbon atoms.

This can increase the compatibility of this monomer with the (meth)acrylamide used to form the second monomeric units.

Group $R_2$ can be a heteroalkyl, aryl, aralkyl, or alkaryl group. Examples of monomers with a heteroalkyl group include, but are not limited to, ethoxyethoxyethyl (meth)acrylate, polyethylene glycol (meth)acrylate, and polypropylene glycol (meth)acrylate. Examples of such monomers include, but are not limited to, 2-phenylethyl acrylate, 3-phenylethyl acrylate, and 2-biphenylethyl acrylate.

The first monomeric unit is often selected to control the final glass transition temperature (Tg) and shear storage modulus (G') of the (meth)acrylate copolymer and the adhesive. In many embodiments, the alkyl (meth)acrylates are alkyl acrylates. The use of alkyl acrylates rather than alkyl methacrylates often results in (meth)acrylate copolymers having a lower glass transition temperature and lower shear storage modulus (G'). The lower glass transition temperature and lower shear storage modulus (G') of the (meth)acrylate copolymers may be needed to provide a pressure-sensitive adhesive composition. The final glass transition temperature (Tg) for the (meth)acrylate copolymer is typically equal to at least −20° C., at least −15° C., at least −10° C., at least −5° C., or at least 0° C. and is often no greater than 40° C., no greater than 30° C., no greater than 20° C., or no greater than 10° C. When the Tg exceeds 20° C., the adhesive may need to be heat-activated (i.e. upon heating slightly above the Tg, the material becomes tacky and adheres with no more than finger pressure). Upon cooling the below Tg these heat-activated adhesive will no longer be tacky but have sufficient ability to hold onto an adherend and have sufficient cohesive strength to be cleanly removed from the adherend. The glass transition temperature can be measured using Dynamic Mechanical Analysis at a frequency of 1 radian/second as described in the Examples section below.

The curable (meth)acrylate copolymer contains at least 50 weight percent of the first monomeric unit based on a total weight of the curable (meth)acrylate copolymer. If the amount of the first monomeric unit is lower than at least 50 weight percent, the glass transition temperature of the (meth) acrylate copolymer may not be suitable for a pressure-sensitive adhesive. For example, the (meth)acrylate copolymer often contains at least 55 weight percent, at least 60 weight percent, at least 65 weight percent, at least 70 weight percent, or at least 75 weight percent of the first monomeric unit. The amount of the first monomeric unit can be up to 94 weight percent. If the amount of the first monomeric unit is greater than 94 weight percent, there may be insufficient amounts of the second monomeric unit and the third monomeric unit in the curable (meth)acrylate copolymer. For example, the amount can be up to 90 weight percent, up to 85 weight percent, or up to 80 weight percent. In some embodiments, the amount of the first monomeric unit is in a range of 50 to 94 weight percent, 60 to 94 weight percent, 70 to 94 weight percent, 80 to 94 weight percent, 60 to 90 weight percent, 70 to 90 weight percent, or 80 to 90 weight percent. The amounts are based on the total weight of the (meth)acrylate copolymer.

The curable (meth)acrylate copolymer further includes a second monomeric unit of Formula (II) in an amount in a range of 6 to 10 weight percent based on the total weight of monomeric units in the curable (meth)acrylate copolymer.

(II)

Group $R_1$ is hydrogen or methyl. Stated differently, the second monomeric unit is derived from (meth)acrylamide, which refers to acrylamide and/or methacrylamide.

The second monomeric unit advantageously provides hydrogen bonding within the curable (meth)acrylate copolymer. This hydrogen bonding tends to enhance the dimensional stability of die-cut films of the adhesive composition prior to curing. Stated differently, dimensional stability can be provided even though no covalent crosslinks have been formed in the curable (meth)acrylate copolymer (i.e. covalent crosslinks form from the third monomeric unit of the curable (meth)acrylate when exposed to ultraviolet radiation or when exposed to ultraviolet or visible light radiation in the presence of a photoinitiator). The second monomeric unit also can enhance adhesion of the cured adhesive composition to substrates and/or enhance the cohesive strength of both the curable and cured adhesive compositions.

The (meth)acrylate copolymer typically contains at least 6 weight percent of the second monomeric unit. This amount is often needed to provide the desired hydrogen bonding within the curable (meth)acrylate copolymer. In some examples, the (meth)acrylate copolymer contains at least 6.5 weight percent or at least 7 weight percent of the second monomeric unit. The amount of the second monomeric unit can be up to 10 weight percent. If greater than 10 weight percent of the second monomeric unit is included in the (meth)acrylate copolymer, the glass transition temperature may be too high to function as a pressure-sensitive adhesive. Additionally, there may be miscibility issues with the other monomers included in the polymerizable composition used to form the (meth)acrylate copolymer. In some examples, the (meth)acrylate copolymer contains up to 9.5 weight percent, up to 9 weight percent, up to 8.5 weight percent, or up to 8 weight percent of the second monomeric unit. The amount of the second monomeric unit is often in a range of 6 to 10 weight percent, 6.5 to 10 weight percent, 6 to 9 weight percent, or 6 to 8 weight percent based on a total weight of the (meth)acrylate copolymer.

The curable (meth)acrylate copolymer still further comprises a third monomeric unit of Formula (III) in an amount in a range of 0.05 to 5 weight percent based on the total weight of monomeric units of the curable (meth)acrylate copolymer.

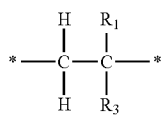

(III)

In Formula (III), group $R_1$ is the same as defined above and group $R_3$ comprises 1) an aromatic ketone group that causes hydrogen abstraction from a polymeric chain when exposed to ultraviolet radiation or 2) a (meth)acryloyl group (i.e., pendant (meth)acryloyl group) that undergoes free radical polymerization when exposed to ultraviolet or visible light radiation in the presence of a photoinitator. The hydrogen abstraction type aromatic ketone groups typically require exposure to ultraviolet radiation to trigger a reaction. The pendant (meth)acrylate group can react upon exposure to either ultraviolet or visible light radiation based on the absorbance of the photoinitiator in the ultraviolet and visible regions of the electromagnetic spectra.

In the first type of the third monomeric unit of Formula (III), the $R_3$ group comprises an aromatic ketone group. When exposed to ultraviolet radiation, the aromatic ketone group can abstract a hydrogen atom from another polymeric chain or from another portion of the polymeric chain. This abstraction results in the formation of radicals that can subsequently combine to form crosslinks between polymeric chains or within the same polymeric chain. In many embodiments, the aromatic ketone group is an aromatic ketone group such as, for example, a derivative of benzophenone, acetophenone, or anthroquinone. Monomers that can result in this type of third monomeric unit of Formula (III) include 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like.

In the second type of the third monomeric unit of Formula (III), the $R_3$ group comprises a (meth)acryloyl group. That is, $R_3$ is a group that can undergo free-radical reaction in the presence of ultraviolet or visible light radiation and a photoinitiator. The curable (meth)acrylate copolymer is typically not prepared directly with this type of third monomeric unit present. Rather, a precursor (meth)acrylate copolymer is initially prepared and then further reacted with an unsaturated reagent compound to introduce the pendant (meth) acryloyl group. Typically, the introduction of the pendant (meth)acryloyl group involves (1) the reaction between a nucleophilic group on the precursor (meth)acrylate copolymer and an electrophilic group on the unsaturated reagent compound (i.e., the unsaturated reagent compound includes both an electrophilic group and a (meth)acryloyl group) or (2) the reaction between electrophilic groups on the precursor (meth)acrylate copolymer and a nucleophilic group on the unsaturated reagent compound (i.e., the unsaturated reagent compound includes both a nucleophilic group and a (meth)acryloyl group). These reactions between the nucleophilic group and electrophilic group typically are ring opening, addition, or condensation reactions.

In some embodiments of this second type, the precursor (meth)acrylate copolymer has hydroxy, carboxylic acid (—COOH), or anhydride (—O—(CO)—O—) groups. If the precursor (meth)acrylate copolymer has hydroxy groups, the unsaturated reagent compound often has a carboxylic acid (—COOH), isocyanato (—NCO), epoxy (i.e., oxiranyl), or anhydride group in addition to a (meth)acryloyl group. If the precursor (meth)acrylate copolymer has carboxylic acid groups, the unsaturated reagent compound often has a hydroxy, amino, epoxy, isocyanato, aziridinyl, azetidinyl, or oxazolinyl group in addition to a (meth)acryloyl group. If the precursor (meth)acrylate copolymer has anhydride groups, the unsaturated reagent compound often has a hydroxy or amine group in addition to a (meth)acryloyl group.

In some examples, the precursor (meth)acrylate copolymer has carboxylic acid groups and the unsaturated reagent compound has an epoxy group. Example unsaturated reagent compounds include, for example, glycidyl (meth)acrylate and 4-hydroxybutyl acrylate glycidyl ether. In other examples, the precursor (meth)acrylate copolymer has anhydride groups and it is reacted with an unsaturated reagent compound that is a hydroxy-substituted alkyl (meth)acrylate such as 2-hydroxyethyl (meth)acrylate, 3-hydroxypropyl (meth)acrylate, or the like. In yet other examples of this second type, the precursor (meth)acrylate copolymer has hydroxy groups and the unsaturated reagent compound has an isocyanato group and a (meth)acryloyl group. Such unsaturated reagent compounds include, but are not limited to, isocyanatoalkyl (meth)acrylate such as isocyanatoethyl (meth)acrylate. The use of a precursor (meth)acrylate copolymer having hydroxy groups may be preferable in applications where the adhesive is used in articles having metal-containing components. Hydroxy groups are less problematic in terms of corrosion than acidic groups or anhydride groups.

The second type of $R_3$ group can be of formula $CH_2$=$CHR_1$—(CO)-Q-L- where L is a linking group and Q is oxy (—O—) or —NH—. The group L includes an alkylene, arylene, or combination thereof and can optionally further include —O—, —O—(CO)—, —NH—(CO)—, —NH—, or a combination thereof depending on the particular precursor (meth)acrylate copolymer and the particular unsaturated reagent compound that is reacted to form the (meth)acryloyl-containing $R_3$ group. In some particular examples, the second type of $R_3$ group is $H_2C$=$CHR_1$—(CO)—O—$R_6$—NH—(CO)—O—$R_5$—O—(CO)— formed by the reaction of a pendant hydroxy-containing group of formula —(CO)—O—$R_5$—OH on the precursor (meth)acrylate with a unsaturated reagent compound that is an isocyanatoalkyl (meth)acrylate of formula $H_2C$=$CHR_1$—(CO)—O—$R_6$—NCO. Groups $R_5$ and $R_6$ are each independently an alkylene group such as an alkylene having 1 to 10 carbon atoms, 1 to 6 carbon atoms, or 1 to 4 carbon atoms. $R_1$ is methyl or hydrogen.

The third monomeric unit is typically present in an amount in a range of 0.05 to 5 weight percent based on a total weight of the (meth)acrylate copolymer. If less than 0.05 weight percent is used, the concentration may be too low to ensure that adequate curing occurs. For example, the concentration can be at least 0.1 weight percent, at least 0.2 weight percent, at least 0.3 weight percent, or at least 0.4 weight percent. An amount over 5 weight percent, however, may result in decreased adhesive performance for an adhesive containing the cured (meth)acrylate copolymer, and/or increased stress buildup in the articles containing the cured (meth)acrylate copolymer, and/or delamination of the adhesive from the substrates within the articles containing the cured (meth)acrylate copolymer. Also, if the third monomeric units are of the first type containing an aromatic ketone group, yellowing can occur in the adhesive layer when the amount exceeds 5 weight percent or even lower. For example, the concentration can be up to 4 weight percent, up to 3 weight percent, up to 2 weight percent, up to 1.5 weight percent, up to 1 weight percent, up to 0.8 weight percent, or up to 0.6 weight percent. In some embodiments, the amount of the third monomeric unit is in a range of 0.1 to 5 weight percent, 0.1 to 4 weight percent, 0.1 to 3 weight percent, 0.1 to 2 weight percent, 0.2 to 2 weight percent, 0.2 to 1.5 weight percent, 0.2 to 1 weight percent, 0.3 to 5 weight percent, 0.3 to 2 weight percent, 0.3 to 1 weight percent, 0.4 to 2 weight percent, or 0.4 to 1 weight percent. If high optical transmission is desired, the amount of the third monomeric unit of the first type is often no greater than 2 weight percent.

The curable (meth)acrylate copolymer optionally can further comprises a fourth monomeric unit of Formula (IV) in an amount in a range of 0 to 10 weight percent based on the total weight of the curable (meth)acrylate copolymer.

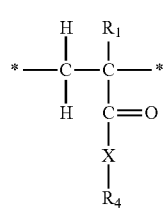

(IV)

In Formula (IV), group $R_1$ is the same as defined above, group X is —O— or —NH—, and group $R_4$ is a hydroxy-substituted alkyl group or hydroxy-substituted heteroalkyl group. In many embodiments, the $R_4$ group is a hydroxy-substituted alkyl group having 1 to 20 carbon atoms or 1 to 10 carbon atoms and a single hydroxy group. In other embodiments, the $R_4$ group is a hydroxy-substituted heteroalkyl group having 1 to 20 carbon atoms or 1 to 10 carbon atoms and 1 to 10 heteroatoms, 1 to 6 heteroatoms, or 1 to 4 heteroatoms. The heteroatom is often an oxy (—O—).

Suitable monomeric units of Formula (IV) are typically derived from hydroxy-substituted alkyl (meth)acrylates, hydroxy-substituted alkyl (meth)acrylamides, hydroxy-substituted heteroalkyl (meth)acrylates, and hydroxy-substituted heteroalkyl (meth)acrylamides. Examples of hydroxy-substituted alkyl (meth)acrylates include, but are not limited to, 2-hydroxyethyl (meth)acrylate, 2-hydroxypropyl (meth)acrylate, 3-hydroxypropyl (meth)acrylate, and 4-hydroxybutyl (meth)acrylate. Hydroxy substituted-alkyl (meth)acrylamides include, but are not limited to, 2-hydroxyethyl (meth)acrylamide and 3-hydroxypropyl (meth)acrylamide.

Example hydroxy-substituted heteroalkyl (meth)acrylates include hydroxy-terminated alkylene oxide (meth)acrylate, hydroxy-terminated di(alkylene oxide) (meth)acrylate, and hydroxy-terminated poly(alkylene oxide) (meth)acrylate. The alkylene oxide is typically ethylene oxide or propylene oxide. Specific examples of hydroxy-terminated poly(alkylene oxide) (meth)acrylates include various monomers commercially available from Sartomer (Exton, Pa., USA) under the trade designation CD570, CD571, and CD572 and from Cognis (Germany) under the trade designation BISOMER (e.g., BISOMER PPA 6).

In some embodiments, a precursor (meth)acrylate copolymer is prepared that contains the fourth monomeric units of Formula (IV). Some or all of these monomeric units are then reacted with an unsaturated reagent compound having an isocyanato group and a (meth)acryloyl group to form the curable (meth)acrylate copolymer. That is, the resulting curable (meth)acrylate copolymer has pendant (meth)acryloyl groups.

The presence of the fourth monomeric unit is not desirable in some applications. For example, for use in electronic displays, minimizing the use of hydroxy-containing monomeric units may be desirable. (Meth)acrylate copolymers with low or no optional fourth monomeric unit may advantageously have a dielectric constant that is less dependent on the relative humidity. That is, more hydrophobic (meth)acrylate copolymers are less likely to absorb water so the dielectric constant is less dependent on the relative humidity. Although it may not be desirable to have hydroxy-containing monomers in some applications, the use of the second monomeric units of Formula (II) (i.e., these monomeric units are from (meth)acrylamide) are considered advantageous because they contribute to hydrogen bonding while being non-corrosive.

In some embodiments, the optional fourth monomeric unit is present in an amount up to 10 weight percent based on a total weight of the (meth)acrylate copolymer. The presence of the optional fourth monomeric unit can increase the dielectric constant of the (meth)acrylate copolymer. The amount of the fourth monomeric unit can be up to 9 weight percent, up to 8 weight percent, up to 6 weight percent, or up to 5 weight percent. The optional fourth monomeric unit can be absent or can be present in an amount equal to at least 0.1 weight percent, at least 0.5 weight percent, or at least 1 weight percent. For example, the optional fourth monomer can be present in an amount in a range of 0 to 10 weight percent, 1 to 10 weight percent, 0 to 8 weight percent, 1 to 8 weight percent, 0 to 5 weight percent, or 1 to 5 weight percent.

The amount of the optional fourth monomeric unit is often lower in the curable (meth)acrylate and cured (meth)acrylate than in the precursor (meth)acrylate if the third monomeric unit has a (meth)acryloyl group. That is, part of all of the fourth monomeric unit in the precursor (meth)acrylate copolymer may be used to attach the (meth)acryloyl group by reacting with the unsaturated reagent compound as discussed above.

In addition to the optional fourth monomeric unit of Formula (IV), other optional monomeric units (fifth monomeric units) can be present in the (meth)acrylate copolymer. Other optional monomeric units are typically selected based on compatibility with the other monomeric units in the (meth)acrylate copolymer. These optional monomeric units may also be used to tune the rheological properties of the (meth)acrylate copolymer, such as for adjusting the glass transition temperature or shear storage modulus (G'). These optional monomeric units are also typically selected based on the final use of the curable and/or cured (meth)acrylate copolymer. For example, if the curable and/or cured (meth) acrylate copolymer is used in an electronic display assembly, any optional monomeric units are selected so that an optically clear adhesive can be prepared. For example, monomeric units with aromatic groups (at least in amounts that would interfere with optical clarity) might be advantageously avoided (e.g., styrene).

Example optional monomers (fifth monomers) include, for example, nitrogen-containing monomeric units that are not of Formula (II), (meth)acrylates having an aromatic group (but that is not of Formula (I)), styrene, and styrene-type monomers (e.g., alpha-methyl styrene).

Suitable nitrogen-containing monomeric units that are not of Formula (II) include, for example, monomeric units derived from various N-alkyl (meth)acrylamides and N,N-dialkyl (meth)acrylamides can be included such as N-methyl (meth)acrylamide, N-ethyl (meth)acrylamide, N,N-dimethyl (meth)acrylamide, and N,N-diethyl (meth)acrylamide, N-isopropyl (meth)acrylamide, and N-octyl (meth)acrylamide. Other monomeric units derived from various N,N-dialkylaminoalkyl (meth)acrylates and N,N-dialkylaminoalkyl (meth)acrylamides can be included such as, for example, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide. Other examples include monomeric units derived from N-vinyl pyrrolidone, N-morpholino (meth)acrylate, diacetone (meth)acrylamide, and N-vinyl caprolactam.

Other optional monomeric units included are those formed from (meth)acrylates having an aromatic group that are not of Formula (I) or Formula (III). These monomeric units may negatively impact optical clarity and the amount may need to be controlled for some applications. Example monomers include, but are not limited to, 2-phenoxyethyl acrylate (available under the trade designation SR339 from Sartomer (Exton, Pa.)), 2-(phenylthio)ethyl acrylate (available from Cytec Ind. (Woodland, N.J.)), 2-phenylphenoxyethyl acrylate (available from Double Bond Chemical Ind. Co. (Taipei, Taiwan)), propionic acid (3-phenoxyphenyl) methyl ester (available from Miwon Chemicals Co. (Korea)).

The amount of any other optional monomer or combination of optional monomers is typically no greater than 20 weight percent based on a total weight of the curable (meth)acrylate copolymer. That is, the amount of the other optional monomer is no greater than 15 weight percent, no greater than 10 weight percent, or no greater than 5 weight percent and, if present, equal to at least 1 weight percent, at least 2 weight percent, or at least 5 weight percent. The amount can be in a range of 0 to 20 weight percent, 1 to 20 weight percent, 5 to 20 weight percent, 0 to 10 weight percent, 1 to 10 weight percent, 0 to 5 weight percent, or 1 to 5 weight percent.

In some embodiments, the curable (meth)acrylate copolymer is free or substantially free of monomeric units having acidic groups. For example, the (meth)acrylate copolymer is free or substantially free of monomeric units derived from (i.e., formed from) (meth)acrylic acid. In other embodiments, the (meth)acrylate copolymer is free or substantially free of monomeric units that have groups that can be easily hydrolyzed to provide an acidic group. For example, the (meth)acrylate copolymer is free or substantially free of monomeric units derived from anhydride-containing monomers (e.g., maleic anhydride) or vinyl esters (e.g., vinyl acetate). Stated differently, the (meth)acrylate copolymer usually is not derived from acidic monomers or monomers that can be hydrolyzed to form acidic groups. In still other embodiments, the (meth)acrylate copolymer is free or substantially free of monomeric units that have aromatic rings other than those of the type-one monomers of Formula (III). For example, the (meth)acrylate copolymer is free or substantially free of monomeric units derived from styrene or styrene-type monomers. As used herein in reference to monomeric units within the (meth)acrylate copolymer, the term "substantially free" means that the amount of the monomeric unit is less than 0.5 weight percent, less than 0.2 weight percent, less than 0.1 weight percent, less than 0.05 weight percent, or less than 0.01 weight percent based on a total weight of the (meth)acrylate copolymer.

In addition to the monomers used to form the various monomeric units described above, the polymerizable composition used to prepare the (meth)acrylate copolymer typically includes a free radical initiator to commence polymerization of the monomers. The free radical initiator can be a photoinitator or a thermal initiator. The amount of the free radical initiator is often in a range of 0.05 to 5 weight percent based on a total weight of monomers used.

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is (2,2'-azobis(2,4-dimethylpentanenitrile)) and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemicals, Inc. (Philadelphia, Pa.) under the trade designation LUPEROX (e.g., LUPEROX 101, which is 2,5-bis(tert-butylperoxy)-2,5-dimethylhexane, and LUPEROX 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used, particularly when the second type of monomeric unit of Formula (III) is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 2,4,6-trimethylbenzoylphenylphosphinic acid ethyl ester (commercially available under the trade designation IRGACURE TPO-L), 1-[4-(2-hydroxyethoxy) phenyl]-2-hydroxy-2-methyl-1-propane-1-one (commercially available under the trade designation IRGACURE 2959), 2-benzyl-2-dimethylamino-1-(4-morpholinophenyl) butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The polymerizable composition may optionally further contain a chain transfer agent to control the molecular weight of the resultant (meth)acrylate copolymer. Examples of useful chain transfer agents include, but are not limited to, carbon tetrabromide, alcohols (e.g., ethanol and isopropanol), mercaptans or thiols (e.g., lauryl mercaptan, butyl mercaptan, tert-dodecyl mercaptan, ethanethiol, isooctylthioglycolate, 2-ethylhexyl thioglycolate, 2-ethylhexyl mercaptopropionate, ethyleneglycol bisthioglycolate), and mixtures thereof. If used, the polymerizable mixture may include up to 1 weight percent of a chain transfer agent based on a total weight of monomers. The amount can be up to 0.5 weight percent, up to 0.3 weight percent, up to 0.2 weight percent, or up to 0.1 weight percent and is often equal to at least 0.005 weight percent, at least 0.01 weight percent, at least 0.05 weight percent, or at least 0.1 weight percent. For example, the polymerizable composition can contain 0.005 to 0.5 weight percent, 0.01 to 0.5 weight percent, 0.05 to 0.2 weight percent, 0.01 to 0.2 weight percent, or 0.01 to 0.1 weight percent chain transfer agent based on the total weight of monomers.

The polymerizable composition can further include other components such as, for example, antioxidants and/or stabilizers such as hydroquinone monomethyl ether (p-methoxyphenol, MeHQ), and those available under the trade designation IRGANOX 1010 (tetrakis(methylene(3,5-di-tert-butyl-1-hydroxyhydrocinnamate))methane) from BASF Corp. (Florham Park, N.J., USA), The antioxidant and/or stabilizer can be used to increase the temperature stability of the resulting (meth)acrylate copolymer. If used, an antioxidant and/or stabilizer is typically used in the range of 0.01 percent by weight (weight percent) to 1.0 weight percent, based on the total weight of monomers in the polymerizable composition.

The polymerization of the polymerizable composition can occur in the presence or absence of an organic solvent. If an organic solvent is included in the polymerizable composition, the amount is often selected to provide the desired viscosity to the polymerizable composition and to the polymerized composition. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or combined as mixtures. In some embodiments, the organic solvent is present in an amount less than 15 weight percent, less than 10 weight percent, less than 8 weight percent, less than 6 weight percent, less than 5 weight percent, or less than 2 weight percent based on the total weight of the polymerizable composition. If used, any organic solvent typically is removed at the completion of the polymerization reaction or during coating. In many embodiments, the polymerization occurs with little or no organic solvent present. That is the polymerizable composition is free of organic solvent or contains a minimum amount of organic solvent.

Either the curable (meth)acrylate copolymer or the precursor (meth)acrylate copolymer, depending on the type of monomeric unit of Formula (III) that is used, can be prepared by any conventional polymerization method (such as solution polymerization or emulsion polymerization) including thermal bulk polymerization under adiabatic conditions, as is disclosed in U.S. Pat. No. 5,637,646 (Ellis) and U.S. Pat. No. 5,986,011 (Ellis et al.). Other methods of preparing either type of (meth)acrylate copolymer include the continuous free radical polymerization methods described in U.S. Pat. Nos. 4,619,979 and 4,843,134 (Kotnour et al.) and the polymerization within a polymeric package as described in U.S. Pat. No. 5,804,610 (Hamer et al.).

The curable (meth)acrylate copolymer has a weight average molecular weight ($M_w$) that is in a range of 100,000 to 400,000 Daltons (Da). The adhesive may not have a suitable creep compliance at 25° C. and at 70° C. if the weight average molecular weight is outside of this range. If the molecular weight is lower than 100,000 Da, the amount of the third monomeric unit needed to effectively cure the (meth)acrylate copolymer may be quite high. If the amount of the third monomeric unit is too high, the curing reaction may proceed too rapidly. That is, the (meth)acrylate copolymer may change from having no gel content to having a very high gel content (and thus a highly elastic cured adhesive composition, which may not be desirable in some applications) after exposure to a very low dose of ultraviolet or visible light radiation. The weight average molecular weight is often at least 150,000 Da, at least 200,000 Da, or at least 250,000 Da. If the molecular weight is greater than 400,000 Da, however, the dry curable (meth)acrylate copolymer may have a viscosity that is too high and a stress-relaxation time that is too long to effectively flow and cover various features (e.g., ink-steps) on a substrate. The molecular weight can be up to 350,000 Da or up to 300,000 Da. In some embodiments, the weight average molecular weight is in a range of 100,000 to 350,000 Da, in a range of 100,000 to 300,000 Da, in a range of 150,000 to 400,000 Da, or in a range of 200,000 to 400,000 Da. The weight average molecular weight can be determined by Gel Permeation Chromatography (GPC).

Other monomeric materials having multiple (meth)acryloyl groups can be combined with the curable (meth)acrylate copolymer. These monomers can be added to adjust the crosslink density of the cured (meth)acrylate copolymer. That is, these monomers are usually added to the curable (meth)acrylate copolymer after it has been formed. These monomers can react with pendant (meth)acryloyl groups of the curable (meth)acrylate copolymers when exposed to ultraviolet or visible light radiation in the presence of a photoinitiator. If added, the amount of these monomeric materials is typically in the range of 0 to 30 parts per hundred (pph) based on the weight of the curable (meth)acrylate copolymer. For example, the amount can be at least 1 pph, at least 2 pph, or at least 5 pph and can be up to 30 pph, up to 25 pph, up to 20 pph, up to 15 pph, or up to 10 pph.

Example monomers with two (meth)acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate (e.g., commercially available from Sartomer under the trade designation SR-210, SR-252, and SR-603), polypropylene glycol diacrylate, polyethylene/polypropylene copolymer diacrylate, neopentylglycol hydroxypivalate diacrylate modified caprolactone, and polyurethane diacrylates (e.g., commercially available from Sartomer under the trade designation CN9018 and CN983).

Exemplary monomers with three or four (meth)acryloyl groups include, but are not limited to, trimethylolpropane triacrylate (e.g., commercially available under the trade designation TMPTA-N from Surface Specialties, Smyrna, Ga., and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate, and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

The curable (meth)acrylate copolymer is typically tacky (i.e., the curable (meth)acrylate copolymer is tacky prior to curing with ultraviolet or visible light radiation; in many cases, the cured (meth)acrylate copolymer is also tacky). If desired, tackifiers can be added to the curable (meth)acrylate copolymer (or to a mixture of the monomers prior to formation of the curable (meth)acrylate copolymer). Useful tackifiers include, for example, rosin ester resins, aromatic hydrocarbon resins, aliphatic hydrocarbon resins, and terpene resins. In general, light-colored tackifiers selected from hydrogenated rosin esters, hydrogenated terpenes, or hydrogenated aromatic hydrocarbon resins are preferred.

Low molecular weight (e.g., a weight average molecular weight of 100,000 Da or less as determined by gel permeation chromatography (GPC)) and high glass transition temperature (e.g., greater than 30° C.) polymers derived from (meth)acrylates can be combined with the (meth) acrylate copolymer. Suitable low molecular weight polymers are described, for example, in U.S. Pat. No. 6,783,850 (Takizawa et al.), U.S. Pat. No. 6,448,339 (Tomita), U.S. Pat. No. 4,912,169 (Whitmire et al.), and U.S. Pat. No. 6,939,911 (Tosaki et al.). These polymers can function as tackifiers.

Plasticizers may also be used to adjust the rheology of the adhesive composition. The plasticizers may be non-reactive compounds such as phosphate, adipate, and phthalate esters. Various low glass transition temperature (e.g., lower than 0° C.), lower molecular weight (e.g., a Mw less than 100,000 Daltons as determined by GPC) acrylic polymers, prepared similarly to the acrylic tackifiers described above can also be used as plasticizers.

Other optional additives include, for example, antioxidants, UV stabilizers, UV absorbers, pigments, curing agents, and polymer additives. These other optional additives can be selected, if desired, so that they do not significantly reduce the optical clarity of the adhesive composition.

The curable (meth)acrylate copolymer (or a curable adhesive containing the curable (meth)acrylate copolymer) can be cured to form a cured (meth)acrylate (or a cured adhesive containing the cured (meth)acrylate copolymer). Significantly, a curable (meth)acrylate copolymer or the curable adhesive composition are often in the form of a layer (e.g., film) that can be stored or transported for later curing by a customer. That is, the hydrogen bonding within the curable (meth)acrylate copolymer adds cohesive strength to the curable (meth)acrylate copolymer (or to the curable adhesive composition). This cohesive strength enhances the dimensional stability of the layer and reduces the tendency to flow if the temperature is close to room temperature or less than 40° C.

The curable (meth)acrylate copolymer and an adhesive composition containing the curable (meth)acrylate copolymer has a creep compliance that is less than $5(10^{-4})$ inverse Pascals at 25° C. and a creep compliance that is greater than $1(10^{-3})$ inverse Pascals at 70° C. prior to curing with ultraviolet or visible light radiation. Creep compliance is measured as described in the Example section using a parallel plate rheometer. The amount $5(10^{-4})$ can be written as 5E(−04) and the amount $1(10^{-3})$ can be written as 1E(−03).

Because the creep compliance is less than $5(10^{-4})$ inverse Pascals at 25° C., a film or layer of the curable adhesive composition tends to have dimensional stability during storage and/or transport, provided that the temperature remains near room temperature. That is, the film or layer does not readily flow at 25° C. and has dimensional stability. In some embodiments, the creep compliance is less than $4(10^{-4})$ inverse Pascals, less than $3(10^{-4})$ inverse Pascals, or less than 2(10) inverse Pascals at 25° C. This low creep compliance at 25° C. means that partial crosslinking (as a result of partial curing) is not required prior to storage and/or transport. Partial curing, which can be difficult to control from batch to batch, is not required for dimensional stability of the curable adhesive compositions. The low creep compliance at 25° C. allows increased consistency of composition and dimensions from batch to batch of die-cut layers (e.g., films) produced from the curable adhesive compositions. In some embodiments, the creep compliance at 25° C. is greater than $1(10^{-5})$ inverse Pascals or greater than $5(10^{-5})$ inverse Pascals.

Because the creep compliance is greater than $1(10^{-3})$ inverse Pascals at 70° C., a film or layer of the curable adhesive composition tends to have sufficient flow at commonly used autoclave temperatures to flow and cover various features that may be present on a surface of the substrate to which the film or layer is laminated. In some embodiments, the creep compliance is greater than $2(10^{-3})$ inverse Pascals, greater than $3(10^{-3})$ inverse Pascals, greater than $5(10^{-3})$ inverse Pascals, or greater than $1(10^{-2})$ inverse Pascals at 70° C. If the creep compliance is too high, there can be issues with boundary control during the assembly of the display (e.g., the adhesive may flow too much under lamination or autoclave conditions). The amount of flow, however, can often be controlled by simply lowering the lamination or autoclave temperature.

Typically, the layer (e.g., film) of curable adhesive composition can flow sufficiently at temperatures in a range of 40° C. to 80° C., which is a typical autoclave temperature range used in the formation of electronic display assemblies, to cover features on a substrate having a height that is equal to 30 to 100 percent of the thickness of the film. For example, the features can have a height that is equal to at least 40 percent, at least 50 percent, at least 60 percent, at least 70 percent, at least 80 percent, or at least 90 percent of the thickness of the film of curable adhesive composition. If used in an electronic display assembly, the feature often is an ink-step, which can have a height up to 100 micrometers or more, up to 80 micrometers, up to 70 micrometers, up to 60 micrometers, up to 40 micrometers, up to 20 micrometers, or up to 10 micrometers.

The adhesive composition (i.e., the curable adhesive composition prior to curing with ultraviolet or visible light radiation) has a shear storage modulus equal to at least 40 kPa when measured at 25° C. and a frequency of 1 radian/second (rad/sec). If the shear storage modulus is less than 40 kPa, the adhesive may flow upon aging at room temperature for about one week. Such adhesive may not have the desired dimensional stability needed for some applications. The shear storage modulus is often at least 60 kPa or at least 70 kPa. The shear storage modulus is no greater than 300 kPa (this is often the upper limit for a pressure-sensitive adhesive but heat activated adhesives can be higher such as up to 400 kPa, up to 500 kPa, or up to 600 kPa) but is often no greater than 200 kPa, no greater than 150 kPa, or no greater than 135 kPa. In some embodiments, the shear storage modulus is in a range of 40 to 200 kPa, in a range of 40 to 150 kPa, in a range of 40 to 125 Pa, or in a range of 50 to 125 kPa.

The curable (meth)acrylate copolymer and/or the associated curable adhesive compositions combine the properties of high flowability needed during processing (e.g., lamination and autoclave steps typically carried out at elevated temperature such as 40° C. to 80° C.), and the dimensional stability and the cohesive strength needed for storage and/or transport to the end user (typically at temperatures in a range of about room temperature to less than 40° C.). The cohesive strength allows for good converting (e.g., slitting or die cutting) characteristics and film-like behavior at room temperature while retaining highly viscous character (and thus low elasticity and short stress relaxation times) at elevated temperature. Advantageously, the adhesive compositions can have good dimensional stability when stored at room temperature and do not require refrigeration to maintain dimensional stability.

In another aspect, an article is provided that includes a first substrate and a layer of the curable adhesive composition adjacent to the first substrate. The layer of the curable adhesive composition is often in the form of a film. As used herein, the term "adjacent" can be used to refer to two materials, typically in the form of layers, that are in direct contact or that are separated by one or more other materials, such as primer or hard coating layers. Often, adjacent materials are in direct contact.

Various methods can be used to form the article. For example, an adhesive composition containing a curable (meth)acrylate copolymer, an optional photoinitiator, and any other optional additives can be coated out of a solvent or from a melt. Such methods are well known to those of skill in the art. If processed out of a coating composition that includes a solvent, a suitable solvent is one that is miscible with the other components of the coating composition. By this, it is meant that the coating composition remains homogeneous in diluted form and during drying such that there is no premature separation of the components out of the solvent. A suitable solvent, if used, is one that can be removed easily from the coated layer. Also, a suitable solvent is one that does not damage the substrate to which the coating composition is applied (for example, it cannot cause crazing of a polymer film). Exemplary solvents include methyl ethyl ketone, methyl isobutyl ketone, 1-methoxy-2-propanol, isopropyl alcohol, toluene, ethyl acetate, butyl acetate, acetone, and the like, and mixtures thereof.

In many embodiments, the article includes a first substrate, a second substrate, and a layer of the curable adhesive composition positioned between the first substrate and the second substrate. The curable (meth)acrylate copolymer within the curable adhesive composition can be transformed to a cured (meth)acrylate copolymer. The method of curing the curable (meth)acrylate copolymer is dependent on the type of third monomeric unit of Formula (III) used. If the third monomeric unit of Formula (III) is of the first type (having an aromatic ketone group that can undergo hydrogen-abstraction reactions), curing can occur by exposing the curable (meth)acrylate copolymer or curable adhesive composition to ultraviolet radiation. If the third monomeric unit of Formula (III) is of the second type (having a pendant (meth)acryloyl group), the adhesive composition includes a mixture of the curable (meth)acrylate copolymer and a photoinitiator. Curing occurs by exposing the mixture to ultraviolet or visible light radiation.

Any of the photoinitiators discussed above can be used for curing the curable (meth)acrylate copolymer having the second type of third monomeric unit. Specific examples include, but are not limited to, those available under the trade designations IRGACURE 651 from BASF Corp. (Tarrytown, N.Y.), which is 2,2-dimethoxy-2-phenylacetophenone, IRGACURE TPO-L from BASF Corp., and IRGACURE 184 from BASF Corp., which is 1-hydroxycyclohexyl phenyl ketone.

In some embodiments of the article, the layer of the curable adhesive composition is a die-cut layer. More particularly, the article can include a die-cut layer positioned between a first substrate and a second substrate. In some specific articles, at least one of the first substrate and the second substrate is a release liner. For example, in some articles, the die-cut layer is positioned between a first release liner and a second release liner. In some other specific articles, the first substrate is a release liner and the second substrate is an optical substrate (e.g., an optical film).

In another aspect, a method of preparing an article is provided. The method includes providing a first substrate, a second substrate, and a curable adhesive composition layer. The method further includes forming a laminate comprising the first substrate, the second substrate, and the curable adhesive composition layer, wherein the adhesive composition layer is positioned between the first substrate and the second substrate. Still further, the method includes exposing the adhesive composition layer to ultraviolet or visible light radiation to cure the (meth)acrylate copolymer.

The curable adhesive compositions are suitable for electronic display assemblies because of their combined good handling and flow characteristics during processing. These characteristics help manage the amount of Mura and contribute to the ability to cover relatively large ink-steps with minimal risk of bubble formation. Mura often indicates the presence of optical defects (e.g., patterns or creases, or brightness or image unevenness due to cell-gap distortion of an LCD) introduced during the lamination process.

The curable adhesive composition can be exposed to ultraviolet or visible light radiation while positioned between the first substrate and the second substrate to form a cured adhesive composition that is laminated to both the first substrate and the second substrate. Curing can occur at room temperature or at an elevated temperature. In some embodiments, the curing temperature is selected to be at least 20° C. higher than the glass transition temperature of the (meth)acrylate copolymer. The elevated temperature can enhance mobility of the materials and curing efficiency. The laminate is often formed at a temperature equal to at least 40° C. such as, for example, in a range of 40° C. to 80° C. or in the range of 50° C. to 70° C.

The curable adhesive compositions can be laminated to substrates having features and can conform to the features. During lamination, the adhesive can flow to cover features that may project from the base of the substrate. The adhesive composition can often flow to cover all outer surfaces of features that have a height that is up to 100 percent of the thickness of the adhesive composition. In some embodiments, the adhesive composition is in the form of a layer that is cut (e.g., die-cut) to have dimensions suitable for positioning between the first substrate and the second substrate.

When an adhesive is laminated between a printed lens (i.e., the lens has printed ink-steps) and a second display substrate, the curable adhesive composition may need to conform to a large ink-step (i.e., 20-100 or 50-100 micrometers or even higher) with the total adhesive thickness being 50-250 micrometers (or less). Completely wetting this large ink-step during initial assembly is very important, because any trapped air bubbles may become very difficult to remove in the subsequent display assembly steps.

Further, the curable composition often has a low shear storage modulus, G', at lamination temperature (e.g., at a temperature in a range of 40° C. to 80° C.), that is less than $10^5$ Pascal (Pa) (100 kPa) when measured at 1 radian/second frequency. This low shear storage modulus tends to favor good ink wetting, as well as quick deformation and compliance to the sharp edge of the ink-step contour. A suitable adhesive should also have sufficient flow to wet the ink surface. Sufficient flow often correlates with a high tan delta value over a broad range of process temperatures, including lamination and autoclaving (e.g., tan δ of at least 0.6 (measured by DMA) between 40° C. to 80° C. or even slightly higher).

In certain embodiments, the adhesive compositions containing the curable and/or cured (meth)acrylate copolymer are optically clear. Thus, certain articles can be laminates that include an optically clear substrate (e.g., an optical substrate such as an optical film) and an optically clear adhesive layer of the cured or curable adhesive composition adjacent to at least one major surface of the optically clear substrate. The laminates can further include a second substrate permanently or temporarily attached to the adhesive layer and with the adhesive layer being positioned between the optically clear substrate and the second substrate.

In some example laminates, an optically clear adhesive layer (i.e., a cured or curable adhesive composition described herein) is positioned between two substrates and at least one of the substrates is an optical film, a display unit, a touch sensor, or a lens. Optical films intentionally enhance, manipulate, control, maintain, transmit, reflect, refract, absorb, retard, or otherwise alter light that impinges upon a surface of the optical film. Optical films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Optical films for the provided laminates can also include retarder plates such as quarter-wave and half-wave phase retardation optical elements. Other optically clear films can include anti-splinter films and electromagnetic interference filters. The films may also be used as substrates for ITO (i.e., indium tin oxide) coating or patterning, such as use those used for the fabrication of touch sensors.

In some embodiments, laminates that include a curable or cured adhesive as describe herein can be optical elements, or can be used to prepare optical elements. As used herein, the term "optical element" refers to an article that has an optical effect or optical application. The optical elements can be used, for example, in electronic displays (e.g., liquid crystal displays (LCDs), organic light emitting displays (OLEDs), architectural applications, transportation applications, projection applications, photonics applications, and graphics applications). Suitable optical elements include, but are not limited to, glazing (e.g., windows and windshields), screens or displays, polarizing beam splitters, cathode ray tubes, ITO-coated touch sensors such as those using glass or clear plastic substrates, and reflectors.

In addition to various optics-related applications and/or electronic display assembly applications, both the curable and cured adhesive compositions can be used in a variety of other applications. For example, an article can be formed by forming a layer (e.g., film) of a curable adhesive composition on a backing or release liner. If a release liner is used, the layer can be transferred to another substrate. The other substrate can be, for example, a component of an electronic display assembly. That is, the layer can be laminated to another substrate. The film is often laminated between a first substrate and a second substrate (i.e., the layer of curable adhesive is positioned between the first substrate and the second substrate).

In some examples, the adhesive compositions can be used in a variety of transfer tapes. The transfer tapes can be made by coating a curable adhesive composition on a differential release liner (i.e., a double-sided release liner where both major surfaces of the liner contain a release coating and the release coatings are different) and optionally can be at least partially cured. The adhesive composition is typically coated onto the side of the liner with the higher release value. After coating, the adhesive-coated release liner is wound into a roll to yield the transfer adhesive. Alternatively, the adhesive composition is coated on a first liner and, if needed, dried. A second liner, which usually has a different release value than the first liner, is positioned adjacent to the adhesive opposite the first liner (the PSA is positioned between the first liner and the second liner). When unwinding the adhesive transfer tape, the adhesive remains attached to the side of the liner with the higher release value. In use, the transfer adhesive is unwound and laminated to a substrate surface (e.g., such as those in optics-related devices as disclosed in greater detail below, or non-optics-related devices and articles such as painted panels, metal panels, window glass, automotive panels, etc.). The transfer adhesive has higher adhesion to the substrate surface than to the release liner and thus is transferred from the release liner to the substrate surface.

Turning to the figures, FIG. 1 depicts a cross-sectional view f an exemplary article 10 having a first substrate 12. Disposed on a first surface 12a of the substrate is an inorganic electro-conductive trace 14. The trace forms a grid or pattern on the first surface 12a. The trace does not completely cover the first surface 12a. That is, there are regions of the first substrate 12a exposed. The edges of the trace end at electrical connector pads 16.

Exemplary materials of substrate 12 include glass, polyethylene terephthalate, cyclo-olefin copolymer, polycarbonate, cellulose triacetate, poly(methyl methacrylate), or another polyacrylate. In certain embodiments, the substrate is, or is part of, a lens, a touch sensor, a light emissive display, a light reflective display, or a polarizer film, for example.

Exemplary materials used to produce the inorganic electro-conductive trace 14 include silver, indium tin oxide, doped ZnO, and antimony tin oxide. These electro-conductive traces may also be made from silver or silver nanowires. The electro-conductive traces can be contacted with other electro-conductive traces such as circuits prepared from copper or silver. These circuits, at least in some articles, can also be in direct contact with the adhesive.

As shown in FIG. 1, an adhesive 18 of the present disclosure is adjacent to the trace 14. Because the trace is in a grid format, a portion of the adhesive 18 may be in direct contact with the first surface 12a of the first substrate 12. The adhesive 18 is typically disposed in a layer, on at least a portion of the surface 12a of the substrate 12 and the inorganic electro-conductive trace 14. The thickness of the adhesive layer 18 is sufficient to completely cover the trace. The thickness may not be uniform across its entire surface, as there may be depressions or valleys between the traces.

Although not shown in FIG. 1, in certain embodiments, the inorganic electro-conductive trace may have a thin barrier (protective) layer disposed thereon (not shown), in which case the adhesive 18 will not directly contact the trace. Such protective material may include sputtered silicon dioxide or silicon carbide, or a highly cured acrylate or epoxy based hard coating.

Optionally, the embodiment includes a second substrate 11 disposed on the adhesive 18. In certain embodiments, the first substrate and second substrate, if used, are optical substrates.

Exemplary optical substrates include (or are included as a part of) a display panel, such as a liquid crystal display, an OLED display, a touch panel, an electrophoretic display, an electrowetting display or a cathode ray tube, a window or glazing, an optical component such as a reflector, polarizer, diffraction grating, mirror, or cover lens, or another film such as a decorative film or optical film. In some embodiments, the optical substrates can be optically clear.

Representative examples of optically clear substrates include glass and polymeric substrates including those that contain polycarbonates, polyesters (e.g., polyethylene terephthalates and polyethylene naphthalates), polyimides, polyurethanes, poly(meth)acrylates (e.g., poly(methyl methacrylates)), polyvinyl alcohols, polyolefins (e.g., polyethylenes, polypropylenes, and cyclic olefin copolymers), and cellulose triacetates. Typically, cover lenses can be made of glass, poly(methyl methacrylates), or polycarbonate.

Figure 2:
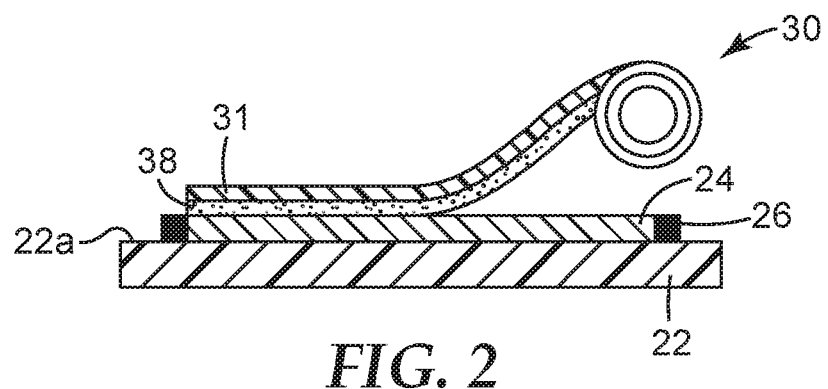
FIG. 2 is a schematic view of an exemplary method of making an article according to the present disclosure.

FIG. 2 depicts a schematic view of an exemplary process of making an article of FIG. 1. The process includes a step of providing a first substrate 22 having a first surface 22a. An inorganic electro-conductive trace 24 with electrical connector pads 26 is disposed on the first surface 22a. A roll of transfer tape 30 is provided. The roll of transfer tape 30 includes an adhesive 38 of the disclosure coated on a liner 31. Optionally, the liner 31 includes release coatings allowing for the roll of tape to unwind. The transfer tape 30 is laminated to the first substrate 22 such that the adhesive 38 is in contact with the trace 24. Because the trace 24 does not completely cover the first surface 22a of the first substrate 22, the adhesive 38 is also in contact with the first surface 22a.

Typically, the liner 31 is removed and discarded and a second substrate can be laminated onto the adhesive 38. The second substrate (not shown in FIG. 2, and analogous to 11 in FIG. 1), if used, is typically optically clear. Examples of optically clear substrates are described herein. Upon lamination of the two substrates, a bond is typically formed without an air gap.

In certain embodiments, after applying the laminate, the adhesive 38 can be exposed to an energy source (e.g., a source of ultraviolet or visible light radiation) to cure the (meth)acrylate copolymer by reacting the $R_3$ group of the monomeric units of Formula (III) and by building the molecular weight. The cured (meth)acrylate copolymer is a durable polymeric network having a higher cohesive strength and higher viscosity compared to the curable (meth)acrylate copolymer. However, even the cured adhesive is not so highly crosslinked that the material is brittle or friable at room temperature.

While FIG. 2 depicts the use of a transfer tape, the method can also be practiced using cut sheets or die-cut films made from a transfer tape, for example. Also, in certain embodiments, the adhesive 38 can also include a second protective liner disposed thereon (not shown) on the surface opposite the liner 31.

Suitable liners include flexible backing materials conventionally used as a tape backing, optical film, or release liner. In general, any suitable flexible material can be used without specific limitations on its refractive index or optical clarity since it is removed and does not become part of the article that includes the display substrate. Typical examples of flexible backing materials used as tape backings that may be useful for the laminates described herein include those made of paper (c.a., Kraft paper) or polymeric films such as polypropylene, polyethylene, polyurethane, polyester (e.g., polyethylene terephthalate), ethylene vinyl acetate, cellulose acetate, and ethyl cellulose. Some flexible backings may have coatings. For example a release liner may be coated with a low adhesion component, such as a silicone-containing material or a fluorocarbon-containing material.

Various embodiments are provided that are adhesive compositions, articles containing the adhesive composition, and methods of making the articles.

Embodiment 1A is a curable adhesive composition that contains (1) a curable (meth)acrylate copolymer having a weight average molecular weight (Mw) in a range of 100,000 to 400,000 Daltons (Da) and (2) an optional photoinitiator. The curable (meth)acrylate copolymer includes a first monomeric unit of Formula (I) in an amount in a range of 50 to 94 weight percent based on a total weight of monomeric units in the curable (meth)acrylate copolymer.

In Formula (I), $R_1$ is hydrogen or methyl and $R_2$ is an alkyl, heteroalkyl, aryl, aralkyl, or alkaryl group. The curable (meth)acrylate copolymer further includes a second monomeric unit of Formula (II) in an amount in a range of 6 to 10 weight percent based on the total weight of monomeric units in the curable (meth)acrylate copolymer.

Group $R_1$ is the same as defined above for Formula (I). The curable (meth)acrylate copolymer still further comprises a third monomeric unit of Formula (III) in an amount in a range of 0.05 to 5 weight percent based on the total weight of monomeric units of the curable (meth)acrylate copolymer.

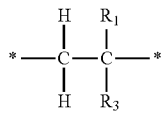
(III)

In Formula (III), group $R_1$ is the same as defined above and group $R_3$ comprises 1) an aromatic ketone group that causes hydrogen abstraction from a polymeric chain when exposed to ultraviolet radiation or 2) a (meth)acryloyl group that undergoes free radical polymerization when exposed to ultraviolet or visible light radiation in the presence of the photoinitiator. The curable (meth)acrylate copolymer yet further comprises an optional fourth monomeric unit of Formula (IV) in an amount in a range of 0 to 20 weight percent based on the total weight of monomeric units of the curable (meth)acrylate copolymer.

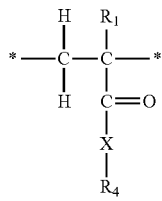
(IV)

In Formula (IV), group $R_1$ is the same as defined above, group X is —O— or —NH—, and group $R_4$ is a hydroxy-substituted alkyl or hydroxy-substituted heteroalkyl. The asterisk (*) in the various formulas indicates a site of attachment to another monomeric unit or a terminal group. The curable adhesive composition prior to curing has a creep compliance that is less than $5(10^{-4})$ inverse Pascals at 25° C. and a creep compliance that is greater than $1(10^{-3})$ inverse Pascals at 70° C. The curable adhesive composition has a shear storage modulus equal to at least 40 kiloPascals (kPa) when measured at 25° C. and 1 radian/second.

Embodiment 2A is the curable adhesive composition of embodiment 1A, wherein $R_2$ is an alkyl or heteroalkyl group.

Embodiment 3A is the curable adhesive composition of embodiment 1A or 2A, wherein $R_2$ is an alkyl that is linear, branched, cyclic, or a combination thereof.

Embodiment 4A is the curable adhesive composition of any one of embodiments 1A to 3A, wherein the curable (meth)acrylate copolymer comprises 7 to 10 weight percent of the second monomeric unit of Formula (II).

Embodiment 5A is the curable adhesive composition of any one of embodiments 1A to 4A, wherein the third monomeric unit is derived from a (meth)acrylate monomer having an aromatic ketone group.

Embodiment 6A is the curable adhesive composition of embodiment 5A, wherein the (meth)acrylate monomer having an aromatic ketone group is selected from 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, or 4-acryloyloxyethoxy-4'-bromobenzophenone.

Embodiment 7A is the curable adhesive composition of any one of embodiments 1A to 6A, wherein the third monomeric unit has a (meth)acryloyl group that undergoes free radical polymerization when exposed to ultraviolet or visible light radiation in the presence of the photoinitiator.

Embodiment 8A is the curable adhesive composition of any one of embodiments 1A to 7A, wherein the amount of the third monomeric unit is in a range of 0.05 to 5 weight percent based on the total weight of the (meth)acrylate copolymer.

Embodiment 9A is the curable adhesive composition of any one of embodiments 1A to 8A, wherein the curable (meth)acrylate copolymer further comprises a fifth monomeric unit derived from a nitrogen-containing monomer other than (meth)acrylamide.

Embodiment 10A is the curable adhesive composition of any one of embodiments 1A to 9A, wherein the curable (meth)acrylate copolymer is free or substantially free of monomeric units derived from an acidic monomer, from an anhydride-containing monomer, or from a vinyl ester monomer.

Embodiment 11A is the curable adhesive composition of any one of embodiments 1A to 10A, wherein the curable (meth)acrylate copolymer is free or substantially free of monomeric units derived from styrene or styrene-type monomer.

Embodiment 12A is the curable adhesive composition of any one embodiments 1A to 11A, wherein the curable adhesive composition further comprises a monomer having multiple (meth)acryloyl groups.

Embodiment 13A is the curable adhesive composition of any one of embodiments 1A to 12A, wherein the curable (meth)acrylate copolymer has a glass transition temperature equal to at least −15° C. when measured using Dynamic Mechanical Analysis at a frequency of 1 radian/second.

Embodiment 14A is the curable adhesive composition of any one of embodiments 1A to 13A, wherein the curable adhesive composition is a pressure-sensitive adhesive composition.

Embodiment 1B is a cured adhesive composition comprising a cured (meth)acrylate copolymer, the cured adhesive composition being a reaction product resulting from exposing a curable adhesive composition to ultraviolet or visible light radiation. The curable adhesive composition comprises (1) a curable (meth)acrylate copolymer having a weight average molecular weight (Mw) in a range of 100,000 to 400,000 Daltons (Da) and (2) an optional photoinitiator. The curable (meth)acrylate copolymer includes a first monomeric unit of Formula (I) in an amount in a range of 50 to 94 weight percent based on a total weight of monomeric units in the curable (meth)acrylate copolymer.

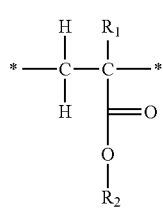
(I)

In Formula (I), $R_1$ is hydrogen or methyl and $R_2$ is an alkyl, heteroalkyl, aryl, aralkyl, or alkaryl group. The curable (meth)acrylate copolymer further includes a second monomeric unit of Formula (II) in an amount in a range of 6 to 10 weight percent based on the total weight of monomeric units in the curable (meth)acrylate copolymer.

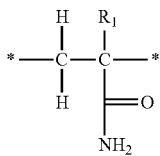
(II)

Group $R_1$ is the same as defined above for Formula (I). The curable (meth)acrylate copolymer still further comprises a third monomeric unit of Formula (III) in an amount in a range of 0.05 to 5 weight percent based on the total weight of monomeric units of the curable (meth)acrylate copolymer.

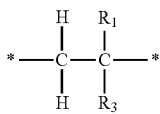
(III)

In Formula (III), group $R_1$ is the same as defined above and group $R_3$ comprises 1) an aromatic ketone group that causes hydrogen abstraction from a polymeric chain when exposed to ultraviolet radiation or 2) a (meth)acryloyl group that undergoes free radical polymerization when exposed to ultraviolet or visible light radiation in the presence of the photoinitiator. The curable (meth)acrylate copolymer yet further comprises an optional fourth monomeric unit of Formula (IV) in an amount in a range of 0 to 20 weight percent based on the total weight of monomeric units of the curable (meth)acrylate copolymer.

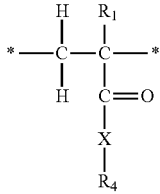
(IV)

In Formula (IV), group $R_1$ is the same as defined above, group X is —O— or —NH—, and group $R_4$ is a hydroxy-substituted alkyl or hydroxy-substituted heteroalkyl. The asterisk (*) in the various formulas indicates a site of attachment to another monomeric unit or a terminal group. The curable adhesive composition prior to curing has a creep compliance that is less than $5(10^{-4})$ inverse Pascals at 25° C. and a creep compliance that is greater than $1(10^{-3})$ inverse Pascals at 70° C. The curable adhesive composition has a shear storage modulus equal to at least 40 kiloPascals (kPa) when measured at 25° C. and 1 radian/second.

Embodiment 2B is the cured adhesive composition of embodiment 1B, wherein the adhesive composition is optically clear.

Embodiment 3B is the cured adhesive composition of embodiment 1B or 2B, wherein $R_2$ is an alkyl or heteroalkyl group.

Embodiment 4B is the cured adhesive composition of any one of embodiment 1B to 3B, wherein $R_2$ is an alkyl that is linear, branched, cyclic, or a combination thereof.

Embodiment 5B is the cured adhesive composition of any one of embodiments 1B to 4B, wherein the curable (meth)acrylate copolymer comprises 7 to 10 weight percent of the second monomeric unit of Formula (II).

Embodiment 6B is the cured adhesive composition of any one of embodiments 1B to 5B, wherein the third monomeric unit is derived from a (meth)acrylate monomer having an aromatic ketone group.

Embodiment 7B is the cured adhesive composition of embodiment 6B, wherein the (meth)acrylate monomer having an aromatic ketone group is selected from 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, or 4-acryloyloxyethoxy-4'-bromobenzophenone.

Embodiment 8B is the cured adhesive composition of any one of embodiments 1B to 7B, wherein the third monomeric unit has a (meth)acryloyl group that undergoes free radical polymerization when exposed to ultraviolet or visible light radiation in the presence of the photoinitiator.

Embodiment 9B is the cured adhesive composition of any one of embodiments 1B to 8B, wherein the amount of the third monomeric unit is in a range of 0.05 to 5 weight percent based on the total weight of the (meth)acrylate copolymer.

Embodiment 10B is the cured adhesive composition of any one of embodiments 1B to 9B, wherein the curable (meth)acrylate copolymer further comprises a nitrogen-containing monomer other than (meth)acrylamide (not of Formula (II)), a (meth)acrylate having an aromatic group (not of Formula (I)).

Embodiment 11B is the cured adhesive composition of any one of embodiments 1B to 10B, wherein the curable (meth)acrylate copolymer further comprises a fifth monomeric unit derived from a nitrogen-containing monomer other than (meth)acrylamide.

Embodiment 12B is the cured adhesive composition of any one of embodiments 1B to 11B, wherein the curable (meth)acrylate copolymer is free or substantially free of monomeric units derived from an acidic monomer, from an anhydride-containing monomer, or from a vinyl ester monomer.

Embodiment 13B is the cured adhesive composition of any one of embodiments 1B to 12B, wherein the cured (meth)acrylate is formed from a curable adhesive composition comprising the curable (meth)acrylate copolymer, a photoinitiator, and a monomer having multiple (meth)acryloyl groups.

Embodiment 14B is the cured adhesive composition of any one of embodiments 1B to 13B, wherein the curable (meth)acrylate copolymer has a glass transition temperature equal to at least −15° C. when measured using Dynamic Mechanical Analysis at a frequency of 1 radian/second.

Embodiment 15B is the cured adhesive composition of any one of embodiments 1B to 14B, wherein the cured adhesive composition is a pressure-sensitive adhesive composition.

Embodiment 1C is an article comprising a first substrate and a layer of the curable adhesive composition of any one of embodiment 1A to 14A or a layer of the cured adhesive composition of any one of embodiment 1B to 15B positioned adjacent to the first substrate.

Embodiment 2C is the article of embodiment 1C, further comprising a second substrate, wherein the layer of the curable adhesive composition or the layer of the cured adhesive composition is positioned between the first substrate and the second substrate.

Embodiment 3C is the article of embodiment 1C or 2C, wherein at least one of the first substrate and the second substrate has at least one feature with a height in a range of 30 to 100 percent of a thickness of the layer of curable adhesive composition or the layer of the cured adhesive composition and wherein the layer of the curable adhesive composition or the layer of the cured adhesive composition covers an outer surfaces of the feature.

Embodiment 4C is the article of any one of embodiments 1C to 3C, wherein at least one of the first substrate or second substrate is an optical film, display unit, touch sensor, or lens.

Embodiment 5C is the article of any one of embodiments 1C to 4C, wherein the layer of the curable adhesive composition is a die-cut film.

Embodiment 6C is the article of any one of embodiments 1C to 5C, wherein the layer of curable adhesive composition is a die cut film and wherein the die cut film is adjacent to the first substrate that is a release liner.

Embodiment 7C is the article of embodiment 6C, wherein die cut film is positioned between the first substrate that is a release liner and a second substrate that is a release liner.

Embodiment 8C is the article of embodiment 6C, wherein die cut film is positioned between the first substrate that is a release liner and a second substrate that is an optical substrate.

Embodiment 9C is the article of embodiment 8C, wherein the second substrate is an optical film. Embodiment 10C is the article of any one of embodiments 1C to 9C, wherein the curable adhesive composition or the cured adhesive composition is a pressure-sensitive adhesive composition.

Embodiment 1D is a method of preparing an article. The method includes providing a first substrate, a second substrate, and a layer of a curable adhesive composition of any one of embodiments 1A to 14A. The method further includes forming a laminate comprising the first substrate, the second substrate, and the layer of the curable adhesive composition, wherein the layer of the curable adhesive composition is positioned between the first substrate and the second substrate. The method yet further includes exposing the layer of the curable adhesive composition to ultraviolet or visible light radiation to cure the curable (meth)acrylate copolymer and form a layer of a cured adhesive composition. That is, the curable (meth)acrylate copolymer within the curable adhesive composition is reacted to form a cured (meth) acrylate copolymer.

Embodiment 2D is the method of embodiment 1D, wherein the cured adhesive composition is optically clear.

Embodiment 3D is the method of embodiments 1D or 2D, wherein the curable (meth)acrylate copolymer has a glass transition temperature equal to at least −15° C. when measured using Dynamic Mechanical Analysis at a frequency of 1 radian/second.

Embodiment 4D is the article of embodiment 1D to 3D, wherein at least one of the first substrate and the second substrate has at least one feature with a height in a range of 30 to 100 percent of a thickness of the layer of the curable adhesive composition and wherein the adhesive composition covers an outer surfaces of the feature.

Embodiment 5D is the method of any one of embodiments 1D to 4D, wherein at least one of the first substrate or second substrate is an optical film, display unit, touch sensor, or lens.

Embodiment 6D is the method of any one of embodiments 1D to 5D, wherein forming a laminate occurs at a temperature equal to at least 40° C.

Embodiment 7D is the method of any one of embodiments 1D to 6D, wherein at least one of the first substrate and the second substrate has at least one feature and wherein forming the laminate comprises flowing the curable adhesive composition to cover an outer surface of the feature.

Embodiment 8D is the method of any one of embodiments 1D to 7D, wherein the curable adhesive composition layer is cut with a die to have dimensions suitable for positioning between the first substrate and the second substrate.

Embodiment 9D is the method of any one of embodiments 1D to 8D, wherein the curable adhesive composition and/or the cured adhesive composition is a pressure-sensitive adhesive composition.

Examples

Objects and advantages of this disclosure are further illustrated by the following examples, but the particular materials and amounts thereof recited in these examples, as well as other conditions and details, should not be construed to unduly limit this disclosure.

TABLE 1

| Materials | | |
|---|---|---|
| Acronym | Description | Supplier |
| nBA | n-Butyl acrylate, a monomer | BASF Corporation (Florham Park, NJ, USA) |
| HA | n-Hexyl acrylate, a monomer | Sigma-Aldrich (St. Louis, MO, USA) |
| CHA | Cyclohexyl acrylate, a monomer | Sigma-Aldrich (St. Louis, MO, USA) |
| 2-OA | 2-Octyl acrylate, a monomer | 3M (St. Paul, MN, USA) |
| 2-EHA | 2-Ethylhexyl acrylate, a monomer | Sigma-Aldrich (St. Louis, MO, USA) |
| 2-EHMA | 2-Ethylhexyl methacrylate, a monomer | Sigma-Aldrich (St. Louis, MO, USA) |
| IBOA | Isobornyl acrylate, a monomer | Sigma-Aldrich (St. Louis, MO, USA) |
| ISTA | Isosteryl Acrylate, a monomer | Shin Nakamura Chemical Co. (Wakayama, JP) |

TABLE 1-continued

Materials

| Acronym | Description | Supplier |
|---|---|---|
| HEA | Hydroxyethyl acrylate, a monomer | Kowa American Corporation (New York, NY, USA) |
| HPA | Hydroxypropyl acrylate, a monomer | Tokyo Chemical Industry Co., LTD (TCI) (Tokyo, Japan) |
| Acm | Acrylamide, a monomer | Zibo Xinye Chemical Co., LTD (Zibo City, Shandong Province, China) |
| ABP | Acryloyl benzophenone, a copolymerizable monomer containing a separately photoreactive group | Prepared using a method similar to that described in Temel et al., *Journal of Photochemistry and Photobiology A: Chemistry*, 219, 26-31 (2011) |
| AeBP | Acryloylethoxy benzophenone, a copolymerizable monomer containing a separately photoreactive group | Prepared using a method similar to that described in U.S. Pat. No. 7,838,110 B2 (Zhu et al.) |
| IOTG | Iso-octyl thioglycolate, a chain transfer agent | Evans Chemetics (Teaneck, NJ, USA) |
| Karenz MT PE1 (PEI) | Pentaerythritol tetrakis (3-mercaptobutylate), a chain transfer agent | Showa Denko America Inc. (New York, NY, USA) |
| TDDM | Tertiary dodecyl mercaptan, a chain transfer agent | Sigma-Aldrich (St. Louis, MO, USA) |
| IRGAURE TPO-L | Ethyl-2,4,6-trimethylbenzoylphenyl-phosphinate, a liquid photoinitiator | BASF Corporation (Florham Park, NJ, USA) |
| IRGACURE 184 | 1-Hydroxy-cyclohexyl-phenyl-ketone, a photoactivated polymerization initiator | BASF Corporation (Florham Park, NJ, USA) |
| VAZO 52 | (2,2'-azo-bis(2,4-dimethylpentanenitrile), a thermally activated polymerization initiator | DuPont (Wilmington, DE, USA) |
| VAZO 67 | (2,2'-azo-bis(2-methylbutanenitrile), a thermally activated polymerization initiator | DuPont (Wilmington, DE, USA) |
| VAZO 88 | 1,1'-azo-bis(cyclohexanecarbonitrile), a thermally activated polymerization initiator | DuPont (Wilmington, DE, USA) |
| LUPEROX 101 | 2,5-bis(tert-butylperoxy)-2,5-dimethylhexane, a thermally activated polymerization initiator | Arkema Incorporated (Philadelphia, PA, USA) |
| LUPEROX 130 | 2,5-Dimethyl-2,5-di-(tert-butylperoxy)-3-hexyne, a thermally activated polymerization initiator | Arkema Incorporated (Philadelphia, PA, USA) |
| MeHQ | Hydroquinone monomethyl ether, a polymerization inhibitor | Sigma-Aldrich (St. Louis, MO, USA) |
| IRGANOX 1010 | Pentaerythritoltetrakis(3-(3,5-ditertbutyl-4-hydroxyphenyl)propionate), an antioxidant | BASF Corporation (Florham Park, NJ, USA) |
| EtAc | Ethyl Acetate | BDH Chemicals (Radnor, PA, USA) |
| MEK | Methyl ethyl ketone | Sigma-Aldrich (St. Louis, MO, USA) |
| PrOH | n-Propyl alcohol | Sigma-Aldrich (St. Louis, MO, USA) |
| DMF | Dimethyl formamide | Sigma-Aldrich (St. Louis, MO, USA) |
| OC PET | SKYROL SH-81, an optically clear polyester film having a thickness of 0.025 millimeters | SKC, Inc. (Atlanta, GA, USA) |

Optical Properties

Haze, percent transmission, and b* properties were measured using a spectrophotometer in transmission mode (UltraScan PRO Spectrophotometer, available from Hunter Associates Laboratory, Incorporated, Reston, Va., USA). Optically clear adhesive (OCA) samples prepared between two release liners were cut to approximately 5 cm by 5 cm. The thickness of the adhesive layer was 150 micrometers. After removal of one of the liners, the sample was laminated to a clear piece of 1 millimeter thick glass using hand pressure insuring no air bubbles get trapped. The second liner was then removed and a layer of optically clear polyester was laminated onto the exposed surface of the OCA using hand pressure insuring no air bubbles get trapped The resulting assembly was evaluated for haze using the spectrophotometer in transmission mode. The wavelength is in the visible range (400 to 700 nanometers). Additional samples were prepared in the same manner, aged in a chamber at 65° C. and 90% relative humidity for 800 hours, removed from the chamber, allowed to cool to room temperature, and then evaluated for haze.

Shear Storage Modulus and Glass Transition Temperature (Tg)

The modulus and glass transition temperature (Tg) of adhesive film samples were determined using a rheological dynamic analyzer (Model DHR-3 Rheometer, which is available from TA Instruments, New Castle, Del., USA) in a parallel plate mode. Samples were prepared by coating the adhesive onto a silicone release liner and drying at 160° C. in a vacuum oven. The resulting film was then pressed at 140° C. to a thickness of approximately 1 millimeter (0.039 inches). After allowing to cool at ambient conditions to room temperature (20° C. to 25° C.), samples were then punched out using an 8 millimeter (0.315 inches) diameter circular die, and centered between two parallel plates, each having a diameter of 8 millimeters, after removal of the release liner.

The plates with adhesive were positioned in the rheometer and compressed until the edges of the adhesive film were uniform with the edges of the top and bottom plates. The temperature was then ramped in two stages, first from 25° C. to −65° C. at 3° C./minute and, after equilibrating back to 25° C., from 25° C. to 150° C. at 3° C./minute while the parallel plates were oscillated at an angular frequency of 1 radian per second and a constant strain of 10 percent. The shear storage moduli (G') and shear loss moduli (G") were measured and used to calculate tan delta (G"/G') as a function of temperature. The peak of the tan delta curve was taken as the glass transition temperature.

Solids Content

Polymer solids content was determined gravimetrically by weighing samples into an aluminum pan and drying at 160° C. under a vacuum for at least 45 minutes. Two samples were run and the average value reported. Percent solids are calculated using the following equation.

Wt.% Solids=$100[(A-B)/(C-B)]$

The variable A is the weight of the dry sample plus aluminum pan. The variable B is the weight of the aluminum pan. The variable C is the weight of the wet sample (before drying) plus aluminum pan.

Molecular Weight Distribution

Polymers were evaluated for their molecular weights using gel permeation chromatography (GPC). The polymer was dissolved in tetrahydrofuran at a concentration of 0.5 percent (weight/volume) and passed through a 0.2 micrometer polytetrafluoroethylene filter. Samples of the resulting solution were analyzed using a Waters Corporation (Milford, Mass., USA) GPC unit equipped with two PLgel 5 micrometer MIXED-D columns (Styragel HR5E 7.8 mm×300 mm) at 35° C. (obtained from Waters Corp., Milford, Mass., USA) and UV (Model 2487) and Refractive Index (Model 2410) detectors. After injection samples were eluted at 1 milliliter/minute. Calibration was carried out using polystyrene standards. The weight average molecular weight (Mw) was determined and reported in kilodaltons (kDa).

Creep Compliance

Adhesive polymeric film samples were evaluated for their creep compliance (J) at various temperatures using a rheological dynamic analyzer (Model DHR-3 Rheometer, which is available from TA Instruments, New Castle, Del., USA) equipped with a Peltier Plate heating fixture. Samples were prepared by coating the polymeric material onto a silicone release liner and drying at 160° C. in a vacuum oven. The resulting polymeric film was then pressed at 140° C. to a thickness of approximately 1 millimeter (0.039 inches). After allowing to cool under ambient conditions to room temperature, samples were then punched out using an 8 millimeter (0.315 inches) diameter circular die, and adhered onto an 8 millimeter diameter upper parallel plate after removal of the release liner. The plate with polymeric film was positioned over and onto the Peltier Plate in the rheometer with the exposed polymeric sample surface contacting the Peltier Plate, and the polymeric film compressed until the edges of the sample were uniform with the edges of the top plate. The temperature was then equilibrated at the test temperatures for 2 minutes at a nominal axial force of 0 grams+/−15 grams. After two minutes, the axial force controller was disabled in order to maintain a fixed gap during the remainder of the test. A stress of 8,000 Pascals was applied to the sample for 300 seconds, and the creep compliance (J) at 287 seconds was recorded.

Examples E1-E13 and Comparative Examples CE1-CE7

For Example 1, 43.5 grams of HA, 5.0 grams of Acm, 1.5 grams of HEA, 0.5 grams of a 10 weight percent solution of VAZO 52 in MEK, 0.40 grams of a 5 weight percent solution of TDDM in MEK, and 50 grams of MEK were added to a glass bottle. The contents were mixed and bubbled with nitrogen for 2 minutes before being sealed and placed in a Laundrometer rotating water bath (SDL Atlas, Rock Hill, S.C., USA) for 24 hours at 60° C. After 24 hours the sample was removed from the Laundrometer and cooled using ambient conditions. The sample was analyzed using GPC to determine that the Mw was 186 kDa.

Examples 2-13 and Comparative Example CE1-CE7 were prepared in a manner similar to Example 1 except with the modifications shown in Table 2 below. Table 2 summarizes the composition used to form the (meth)acrylate copolymer. The amount of the monomers are in weight percent based on the total weight of monomers. The amount of ABP, the amount of AeBP, the amount of solvent, the amount of IEM, the amount of VAZO 52, the amount of TDDM, and the amount of PE1 are pph (parts per hundred—amount added based on 100 grams of (meth)acrylate copolymer).

Next, Examples 1-11 and Comparative Example CE1-CE7 were treated with IEM as follows. The sample in a bottle was purged with air followed by addition of IEM (as a 10 weight percent solution of IEM in MEK) and IRGA-CURE 184 (or TPO-L) in the amounts shown in Table 3. The amounts in this table are based on dry parts per hundred parts of dry polymeric material. The bottle was sealed and taped shut, and placed on a roller for greater than 16 hours. After the first two to four hours, a heat lamp was employed to heat the contents of the bottle to about 60° C. for the remainder of the time.

The weight average molecular weight, polydispersity index, glass transition temperature, shear storage modulus, and creep compliance for each example are shown in Table 4 below.

TABLE 2

Compositions for Examples E1-E13 and Comparative Examples CE1-CE7

| Ex. No. | 2-EHA | 2-OA | ISTA | IBOA | 2-EHMA | CHA | HA | BA | Acm | HEA | ABP or AeBP | MEK | Ethyl Acetate | VAZO 52 | TDDM | PE1 |
|---|---|---|---|---|---|---|---|---|---|---|---|---|---|---|---|---|
| E1 | | | | | | | 87 | | 10 | 3 | | 100 | | 0.1 | 0.04 | |
| E2 | | | | | | | 88 | | 9 | 3 | | 100 | | 0.1 | 0.04 | |
| E3 | | | | | | | 85 | | 8 | 7 | | 100 | | 0.1 | 0.04 | |
| E4 | 60 | | | | 30 | | | | 7 | 3 | | 100 | | 0.1 | 0.04 | |
| E5 | 89 | | | | | | | | 8 | 3 | | 100 | | 0.1 | | 0.15 |
| E6 | 87 | | | | | | | | 10 | 3 | | 100 | | 0.1 | 0.07 | |
| E7 | 39 | | | 22 | | | | 30 | 6 | 3 | | 100 | | 0.1 | 0.04 | |
| E8 | | 90 | | | | | | | 7 | 3 | | 100 | | 0.1 | 0.04 | |
| E9 | 60 | | | | | | | 30 | 7 | 3 | | | 60 | 0.1 | 0.1 | |

TABLE 2-continued

Compositions for Examples E1-E13 and Comparative Examples CE1-CE7

| Ex. No. | 2-EHA | 2-OA | ISTA | IBOA | 2-EHMA | CHA | HA | BA | Acm | HEA | ABP or AeBP | MEK | Ethyl Acetate | VAZO 52 | TDDM | PE1 |
|---|---|---|---|---|---|---|---|---|---|---|---|---|---|---|---|---|
| E10 | 79 | | | | 10 | | | | 8 | 3 | | 66 | | 0.1 | | 0.15 |
| E11 | 27 | 62 | | | | | | | 8 | 3 | | 66 | | 0.1 | | 0.225 |
| E12 | 42 | | | | | | | 50 | 8 | | 0.2 AeBP | 66 | | 0.1 | 0.035 | |
| E13 | 42 | | | | | | | 50 | 8 | | 0.2 ABP | 66 | | 0.1 | 0.035 | |
| CE1 | 95 | | | | | | | | 2 | 3 | | 100 | | 0.1 | 0.07 | |
| CE2 | 93 | | | | | | | | 4 | 3 | | 100 | | 0.1 | 0.07 | |
| CE3 | 92 | | | | | | | | 5 | 3 | | 100 | | 0.1 | 0.07 | |
| CE4 | 91 | | | | | | | | 6 | 3 | | 100 | | 0.1 | 0.07 | |
| CE5 | 60 | | | | | | 30 | | 7 | 3 | | | 60 | 0.1 | 0.40 | |
| CE6 | 60 | | | | | | 30 | | 7 | 3 | | | 60 | 0.1 | 0.60 | |
| CE7 | 60 | | | | | | 30 | | 7 | 3 | | | 60 | 0.1 | 0.06 | |

TABLE 3

Treatment with IEM: Examples E1-E11 and Comparative Examples CE1-CE6

| Ex. No. | IRGACURE 184 (pph) | IEM (pph) | TPO-L (pph) |
|---|---|---|---|
| E1 | 0.35 | 0.50 | |
| E2 | 0.35 | 0.10 | |
| E3 | 0.35 | 2.50 | |
| E4 | 0.35 | 0.50 | |
| E5 | 0.35 | 0.50 | |
| E6 | 0.35 | 0.50 | |
| E7 | 0.35 | 0.50 | |
| E8 | 0.35 | 0.50 | |
| E9 | 0.35 | 0.50 | |
| E10 | 0.35 | 0.50 | |
| E11 | | 0.22 | 0.50 |
| CE 1 | 0.35 | 0.50 | |
| CE 2 | 0.35 | 0.50 | |
| CE 3 | 0.35 | 0.50 | |
| CE 4 | 0.35 | 0.50 | |
| CE 5 | 0.35 | 0.50 | |
| CE 6 | 0.35 | 0.50 | |

TABLE 4

Characterization of Examples E1-E13 and Comparative Examples CE1-CE7

| Ex. No. | Mw (kDa) | Poly-dispersity Index | Tg (° C.) | Modulus (G') at 25° C. (kPa) | 25° C. J (1/Pa) | 70° C. J (1/Pa) |
|---|---|---|---|---|---|---|
| E1 | 186 | 3.4 | −1.6 | 108 | 2.42E−04 | 3.54E−03 |
| E2 | 187 | 3.5 | −10.1 | 79 | 1.27E−04 | 9.07E−03 |
| E3 | 193 | 3.9 | −8.3 | 78 | 1.33E−04 | 8.77E−03 |
| E4 | 158 | 3.9 | 3.5 | 118 | 6.41E−05 | 5.58E−03 |
| E5 | 196 | 3.0 | −10.2 | 52 | 2.72E−04 | 8.65E−03 |
| E6 | 199 | 5.2 | 2.1 | 98 | 1.15E−04 | 2.99E−03 |
| E7 | 209 | 3.8 | −5.4 | 109 | 7.09E−05 | 3.36E−03 |
| E8 | 220 | 4.2 | −3.5 | 86 | 9.98E−05 | 3.80E−03 |
| E9 | 339 | 3.4 | −16.7 | 64 | 1.22E−04 | 2.16E−03 |
| E10 | 181 | 3.3 | −4.5 | 80 | 1.93E−04 | 5.05E−03 |
| E11 | 179 | 4.8 | 7.0 | 51.9 | 3.21E−04 | 2.25E−02 |
| E12 | 258 | 2.8 | −13.1 | 82 | 9.99E−05 | 3.02E−03 |
| E13 | 261 | 2.7 | −13.0 | 75 | 1.61E−04 | 3.76E−03 |
| CE1 | 136 | 3.7 | −41.5 | 2 | 1.10E−01 | 2.89E+00 |
| CE2 | 133 | 3.7 | −30.4 | 5 | 2.21E−02 | 8.26E−01 |
| CE3 | 137 | 3.5 | −23.3 | 8 | 9.78E−03 | 4.75E−01 |
| CE4 | 133 | 3.5 | −16.8 | 20 | 2.31E−03 | 1.96E−01 |
| CE5 | 102 | 2.9 | −16.8 | 30 | 8.08E−04 | 6.72E−02 |
| CE6 | 70 | 2.6 | −15.9 | 16 | 8.00E−03 | 2.52E−01 |
| CE7 | 511 | 2.8 | −17.6 | 60.1 | 6.78E−05 | 7.29E−04 |

Examples E14-E21 and Comparative Example CE8

Example 14: Precursor (2-EHA/BA/Acm/HPA—60/30/7/3) Treated with IEM

A solution was prepared by stirring 57.59 grams 2-EHA, 30.0 grams BA, 3.0 grams HPA, 7.0 grams Acm, 7.0 grams DMF, 0.10 grams IRGANOX 1010, 1.35 grams of 10.0 weight percent solution of TDDM in 2-EHA, and 0.82 grams of a 2.44 weight percent solution of MEHQ in 2-EHA in a 0.24 liter (8 ounce) glass jar and heating to 65° C. After cooling to 50° C., a mixture of 0.40 grams of a 0.25 weight percent solution of VAZO 52 in 2-EHA was added with mixing. Then 80 grams of this mixture was transferred to a stainless steel reactor vessel that was part of an adiabatic reaction apparatus (available under the trade designation VSP2 from Fauske Associates, LLC, Burr Ridge, Ill., USA). The reactor vessel was purged of oxygen while heating and pressurized with 414 kPa (60 pounds per square inch) of nitrogen gas before reaching the induction temperature of 61° C. The polymerization reaction proceeded under adiabatic conditions to a peak reaction temperature of 132° C. A 5.0 gram aliquot was taken from the reaction mixture and the percent solids was 43.45 weight percent based on the total weight of monomers in the mixture.

A solution was prepared by mixing 1.0 gram VAZO 52, 0.10 grams VAZO 88, 0.05 grams LUPEROX 101, 0.15 grams LUPEROX 130, and 48.7 grams ethyl acetate in a 0.12 liter (4 ounce) glass jar. The mixture was shaken on a reciprocating mixer to dissolve the solids. Then, 0.7 grams of the solution was stirred into the reactor vessel. The reactor was purged of oxygen while heating and then pressurized with 414 kPa (60 pounds per square inch) of nitrogen gas before reaching the induction temperature of 59° C. The polymerization reaction proceeded under adiabatic conditions to a peak reaction temperature of 153° C. The mixture was held at that temperature for 30 minutes then drained into a 0.24 liter (8 ounce) jar. A sample was taken and the percent solids was 90.95 weight percent based on the total weight of monomers in the mixture. This sample is a precursor (meth) acrylate copolymer.

The precursor (meth)acrylate copolymer was treated with IEM by the following procedure. 17 grams of polymer was dissolved in 25.5 grams MEK in a 0.12 liter (4 ounce) jar, to which 0.07 grams of IEM and 0.09 grams TPO-L was added. The bottle was sealed and taped shut, and placed on a roller for greater than 16 hours. After the first two to four hours, a heat lamp was employed to heat the contents of the bottle to about 60° C. for the remainder of the time. The properties for this example are in Table 8 below.

Example 15: Precursor (2-EHA/BA/Acm/HPA—60/30/7/3) Treated with IEM

The following components were added to a 1.8 liter stainless steel reactor vessel that was part of a pressure reactor apparatus (available under the trade designation RC1e Process Development Workstation from Mettler-Toledo International, Incorporated, Columbus, Ohio, USA): 574.0 grams 2-EHA, 300.0 grams BA, 30.0 grams HPA, 70.0 grams Acm, 70.0 grams PrOH, 1.0 gram IRGANOX 1010, 8.0 grams of 25.0 weight percent solution of TDDM in 2-EHA, and 16.2 grams of 1.23 weight percent solution of VAZO 52 in 2-EHA. The components were stirred within the reactor vessel. The reactor vessel was purged of oxygen while heating and pressurized with 41 kPa (6 pounds per square inch) of nitrogen gas before reaching the induction temperature of 61° C. The polymerization reaction proceeded under adiabatic conditions to a peak reaction temperature of 124° C. A 15.0 gram aliquot was taken from the reaction mixture and the percent solids was 35.56 weight percent based on the total weight of monomers in the mixture.

A solution was prepared by mixing 1.0 gram VAZO 52, 0.10 grams VAZO 88, 0.05 grams LUPEROX 101, 0.15 grams LUPEROX 130, and 48.7 grams ethyl acetate to a 0.12 liter (4 ounce) glass jar. The mixture was shaken in a reciprocating mixer to dissolve the solids. Then, 10.0 grams of this ethyl acetate solution was stirred into the reactor vessel. The reactor was purged of oxygen while heating and then pressurized with 41 kPa (6 pounds per square inch) of nitrogen gas before reaching the induction temperature of 59° C. The polymerization reaction proceeded under adiabatic conditions to a peak reaction temperature of 148° C. Roughly half of the batch was drained (486.8 grams) and the remaining polymer was vacuum stripped in the reactor vessel of residual solvent and monomers. A sample was taken of the drained polymer and the percent solids was 91.99 weight percent based on the total weight of monomers in the mixture.

After vacuum stripping off the solvent and residual monomers, there was a calculated amount of polymer remaining in the reaction vessel equal to 512 grams. Then 1.48 grams of IEM was added in situ to the reactor vessel and the reactor was held above 150° C. for 30 minutes. Next, 3.84 grams IRGACURE 184 was added into the reactor vessel. This was stirred for an additional 30 minutes. A sample was taken from the reaction mixture and the percent reacted was 98.22 weight percent based on the total weight of monomers in the mixture.

The properties for this example are in Table 8 below.

Example 16: Precursor (2-EHA/BA/Acm/HPA—39/50/8/3) Treated with IEM

A solution was prepared by stirring 36.89 grams 2-EHA, 50.0 grams BA, 3.0 grams HPA, 8.0 grams Acm, 8.0 grams DMF, 0.10 gram IRGANOX 1010, 1.50 grams of 10.0 weight percent TDDM in 2-EHA, and 0.41 gram of 2.44 weight percent MEHQ in 2-EHA within an 8 ounce glass jar and heating to 65° C. After cooling to 50° C., a mixture of 0.36 gram of 0.25 weight percent solids VAZO 52 in 2-EHA was added and mixed. The reactor was purged of oxygen while heating and pressurized with 414 kPa (60 pounds per square inch) of nitrogen gas before reaching the induction temperature of 61° C. The polymerization reaction proceeded under adiabatic conditions to a peak reaction temperature of 147° C. An aliquot (5.0 grams) was taken from the reaction mixture and the percent reacted was 48.72 weight percent based on the total weight of monomers in the mixture.

A solution was prepared by mixing 0.2 gram VAZO 52 initiator, 0.07 gram VAZO 67 initiator, and 49.73 grams ethyl acetate in a 4 ounce glass jar. The mixture was shaken on a reciprocating mixer to dissolve the solids. Then, 0.7 gram of the solution was stirred into the stainless steel reactor. The reactor was purged of oxygen while heating and then pressurized with 414 kPa (60 pounds per square inch (psi)) of nitrogen gas before reaching the induction temperature of 59° C. The polymerization reaction proceeded under adiabatic conditions to a peak reaction temperature of 126° C. The mixture was held at that temperature for 30 minutes and then drained into an 8 ounce jar. An aliquot (5.0 grams) was taken from the reaction mixture and the percent reacted was 77.71 weight percent based on the total weight of monomers in the mixture.

A solution was prepared by mixing 1.0 gram VAZO 67 initiator, 0.25 gram VAZO 88 initiator, 0.15 gram LUPEROX 101 peroxide, 0.15 gram LUPEROX 130 peroxide, and 48.45 grams ethyl acetate in a 4 ounce glass jar. The mixture was shaken on a reciprocating mixer to dissolve the solids. Then, 0.7 gram of the solution was stirred into the stainless steel reactor. The reactor was purged of oxygen while heating and then pressurized with 414 kPa (60 pounds per square inch) of nitrogen gas before reaching the induction temperature of 80° C. The polymerization reaction proceeded under adiabatic conditions to a peak reaction temperature of 123° C. The mixture was isothermally held at that temperature for 30 minutes and then drained into a 0.24 liter (8 ounce) jar. A sample was taken and the percent solids was 96.46 weight percent based on the total weight of monomers in the mixture. This sample is a precursor (meth) acrylate copolymer.

The precursor (meth)acrylate copolymer was treated with IEM by the following procedure. 66.0 grams of polymer was dissolved in 66.0 grams MEK in a 0.24 liter (8 ounce) jar, to which 0.20 grams of IEM was added. The bottle was sealed and taped shut, and placed on a roller for greater than 16 hours. After the first two to four hours, a heat lamp was employed to heat the contents of the bottle to about 60° C. for the remainder of the time. 102.0 grams of this mixture was transferred into a new 0.24 liter (8 ounce) amber jar, to which 0.09 grams IRGACURE 184 was added and mixed on a roller for an additional 10 minutes. The properties for this example are in Table 8 below.

Example 17: Precursor (2-EHA/BA/Acm/HPA—39/50/8/3) Treated with IEM

Example 17 used the precursor polymer from Example 16. After it was treated with IEM, 30 grams of the polymer/MEK solution was transferred to 0.12 liter (4 ounce) amber jar, to which 0.08 grams TPO-L and 3.0 grams of 50 weight percent solids CN983 in MEK was added and mixed on a roller for an additional 10 minutes. The properties for this example are in Table 8 below.

Example 18: Precursor (2-EHA/BA/Acm/HPA—39/50/8/3) Treated with IEM

Example 18 was prepared in a manner similar to Example 15 except with the modifications shown in Tables 5-7 and except that a larger reactor vessel (75 gallon) was used. The properties for this example are in Table 8 below.

Example 19: Precursor (2-EHA/BA/Acm/HPA—39/50/8/3) Treated with IEM

Example 19 was prepared in a manner similar to Example 15 except with the modifications shown in Tables 5-7 and except that a larger reactor vessel (75 gallon) was used. The properties for this example are in Table 8 below.

Example 20: Precursor (2-EHA/BA/Acm/HPA—39/50/8/3) Treated with IEM

Example 20 was prepared in a manner similar to Example 16 except that a larger reactor vessel (300 gallon) was used and its IEM functionalization was conducted in situ via the same procedure as Example 15. All other modifications are shown in Tables 5-7. The properties for this example are in Table 8 below.

Example 21: Precursor (2-EHA/BA/Acm/HPA—39/50/8/3) Treated with IEM

Example 21 was prepared in a manner similar to Example 16 except that a larger reactor vessel (300 gallon) was used and its IEM functionalization was conducted in situ via the same procedure as Example 15. All other modifications are shown in Tables 5-7. The properties for this example are in Table 8 below.

Comparative Example 8: Precursor (2-EHA/BA/Acm/HPA—35/55/7/3) Treated with IEM Comparative Example 8 was prepared in a manner similar to Example 15 except with the modifications shown in Tables 5-7 and except that a larger reactor vessel (300 gallon) was used. The properties for this example are in Table 8 below.

TABLE 5

Compositions Examples E14-E21 and Comparative Example CE8

| Ex. No. | 2-EHA (wt %) | BA (wt %) | Acm (wt %) | HPA (wt %) | DMF (pph) | PrOH (pph) | TDDM (pph) |
|---|---|---|---|---|---|---|---|
| E14 | 60 | 30 | 7 | 3 | 7 | | 0.135 |
| E15 | 60 | 30 | 7 | 3 | | 7 | 0.20 |
| E16 | 39 | 50 | 8 | 3 | 15 | | 0.15 |
| E17 | 39 | 50 | 8 | 3 | 15 | | 0.15 |
| E18 | 35 | 55 | 7 | 3 | 8 | | 0.20 |
| E19 | 39 | 50 | 8 | 3 | 8 | | 0.165 |
| E20 | 39 | 50 | 8 | 3 | 15 | | 0.165 |
| E21 | 39 | 50 | 8 | 3 | 15 | | 0.165 |
| CE8 | 35 | 55 | 7 | 3 | 7 | | 0.20 |

In Table 5, the amounts of monomer are given as weight percent based on the total weight of monomers in the polymerizable composition. The amounts of DMF, PrOH, and TDDM are parts per hundred (pph) based on the weight of the (meth)acrylate copolymer.

TABLE 6

Polymerization Conditions: Examples E14-E21 and Comparative Example CE8

| Ex. No. | Temp. Peak 1 (° C.) | Temp. Peak 2 (° C.) | Temp. Peak 3 (° C.) | % Polymer Step 1 | % Polymer Step 2 | % Polymer Step 3 |
|---|---|---|---|---|---|---|
| E14 | 132 | 153 | N/A | 43.5 | 91.0 | N/A |
| E15 | 124 | 148 | N/A | 35.6 | 92.0 | N/A |
| E16 | 147 | 126 | 123 | 48.7 | 77.7 | 96.5 |
| E17 | 147 | 126 | 123 | 48.7 | 77.7 | 96.5 |
| E18 | 125 | 198 | N/A | 27.3 | NT | N/A |
| E19 | 131 | 190 | N/A | 31.9 | NT | N/A |
| E20 | 130 | 139 | 122 | 32.1 | 67.8 | NT |
| E21 | 122 | 138 | 147 | 25.4 | 69 | NT |
| CE8 | 132 | 182 | N/A | 31.0 | NT | N/A |

N/A: Not Applicable
NT: Not Tested

TABLE 7

Treatment with IEM: Examples E14-E21 and Comparative Example CE8

| Ex. No. | IEM Addition Method | IEM, (pph) | TPO-L, (pph) | IRGACURE 184, (pph) | CN983 (pph) |
|---|---|---|---|---|---|
| E14 | MEK Solution | 0.40 | 0.50 | | |
| E15 | In situ | 0.29 | | 0.75 | |
| E16 | MEK Solution | 0.60 | 0.50 | | |
| E17 | MEK Solution | 0.60 | | 0.18 | 10 |
| E18 | In situ | 0.40 | | 0.75 | |
| E19 | In situ | 0.40 | | 0.75 | |
| E20 | In situ | 0.40 | | 0.35 | |
| E21 | In situ | 0.40 | | 0.35 | |
| CE8 | In situ | 0.40 | | 0.75 | |

TABLE 8

Properties for Examples E14-E21 and Comparative Example CE8

| Ex. No. | Mw (kDa) | Poly-dispersity Index | Tg (° C.) | Modulus (G') at 25° C. (kPa) | Optical Trans (%) | b* | Haze (%) | 25° C. J (1/Pa) | 70° C. J (1/Pa) |
|---|---|---|---|---|---|---|---|---|---|
| E14 | 101 | 6.2 | −15.0 | 50.6 | NT | NT | NT | 3.74E−04 | 1.27E−02 |
| E15 | 157 | 7.5 | −12.0 | 57.0 | NT | NT | NT | 3.77E−04 | 2.75E−02 |
| E16 | 253 | 6.6 | −13.1 | 61.6 | NT | NT | NT | 1.35E−04 | 8.07E−03 |
| E17 | 253 | 6.6 | −15.0 | 52.6 | NT | NT | NT | 4.47E−04 | 2.37E−02 |
| E18 | 216 | 13.2 | −7.6 | 60.7 | 94.4 | 0.23 | 0.50 | 3.60E−04 | 1.94E−02 |
| E19 | 250 | 11.8 | −6.3 | 74.8 | 94.4 | 0.44 | 0.89 | 2.12E−04 | 1.31E−02 |
| E20 | 235 | 8.8 | −5.3 | 91.9 | NT | NT | NT | 1.16E−04 | 7.48E−03 |
| E21 | 248 | 11.8 | −6.5 | 64.2 | NT | NT | NT | 3.64E−04 | 2.14E−02 |
| CE8 | 211 | 11.6 | −20.1 | 28.6 | 95.6 | 0.12 | 0.44 | 1.12E−03 | 5.36E−02 |

NT: Not Tested

We claim:

1. A curable adhesive composition comprising (1) a curable (meth)acrylate copolymer having a weight average molecular weight in a range of 150,000 to 400,000 Da and (2) an optional photoinitiator, wherein the curable (meth)acrylate copolymer comprises:

a) a first monomeric unit of Formula (I) in an amount in a range of 50 to 94 weight percent based on a total weight of monomeric units in the curable (meth)acrylate copolymer

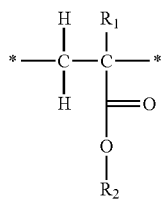

(I)

wherein $R_1$ is hydrogen or methyl; and $R_2$ is an alkyl, heteroalkyl, aryl, aralkyl, or alkaryl group;

b) a second monomeric unit of Formula (II) in an amount in a range of 6 to 10 weight percent based on the total weight of monomeric units in the curable (meth)acrylate copolymer

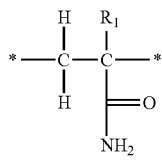

(II)

wherein $R_1$ is hydrogen or methyl:

c) a third monomeric unit of Formula (III) in an amount in a range of 0.05 to 5 weight percent based on the total weight of monomeric units of the curable (meth)acrylate copolymer

(III)

wherein $R_1$ is hydrogen or methyl;

$R_3$ comprises a (meth) acryloyl group that undergoes free radical polymerization in the presence of the photoinitiator when exposed to ultraviolet or visible light radiation; and d) a fourth monomeric unit of Formula (IV) in an amount in a range of 0.1 to 20 weight percent based on the total weight of monomeric units of the curable (meth)acrylate copolymer

(IV)

wherein $R_1$ is hydrogen or methyl;

X is —O— or —NH—;

$R_4$ is a hydroxy-substituted alkyl or hydroxy-substituted heteroalkyl group; and wherein the curable (meth)acrylate copolymer contains 0 to less than 0.1 weight percent of acidic monomeric units based on a total weight of the (meth)acylate copolymer;

the curable adhesive composition has a creep compliance that is less than $5(10^{-4})$ inverse Pascals at 25° C.;

the curable adhesive composition has a creep compliance that is greater than $1(10^{-3})$ inverse Pascals at 70° C.;

the curable adhesive composition has a shear storage modulus equal to at least 40 kiloPascals (kPa) when measured at 25° C. and at a frequency of 1 radian/second.

2. The curable adhesive composition of claim 1, wherein the curable (meth)acrylate copolymer further comprises a fifth monomeric unit that is a nitrogen-containing monomeric unit not of Formula (II).

3. The curable adhesive composition of claim 1, wherein the curable (meth)acrylate copolymer is free or substantially free of monomeric units derived from an acidic monomer, a vinyl ester monomer, or an anhydride-containing monomer.

4. The curable adhesive composition of claim 1, wherein the curable (meth)acrylate copolymer has a glass transition temperature equal to at least −15° C. when measured using Dynamic Mechanical Analysis at a frequency of 1 radian/second.

5. A cured adhesive composition comprising a cured (meth)acrylate copolymer, the cured adhesive composition being a reaction product resulting from exposing a curable adhesive composition to ultraviolet or visible light radiation, wherein the curable adhesive composition is of claim 1.

6. The cured adhesive composition of claim 5, wherein the cured adhesive composition is optically clear.

7. An article comprising a first substrate and a layer of the curable adhesive composition of claim 1 positioned adjacent to the first substrate.

8. The article of claim 7, wherein the layer of the curable adhesive composition is a die-cut film.

9. The article of claim 7, wherein the first substrate is a release liner.

10. The article of claim 8, wherein the article further comprises a second substrate and the die-cut film is positioned between the first substrate that is the release liner and a second substrate, the second substrate being a second release liner or an optical substrate.

11. An article comprising a first substrate, a second substrate, and a layer of the cured adhesive composition of claim 5, wherein the layer of the cured adhesive composition is positioned between the first substrate and the second substrate.

12. A method of preparing an article, the method comprising:
providing a first substrate, a second substrate, and a curable adhesive composition layer of claim 1;
forming a laminate comprising the first substrate, the second substrate, and the curable adhesive composition layer, wherein the curable adhesive composition layer is positioned between the first substrate and the second substrate; and
exposing the curable adhesive composition layer to ultraviolet or visible light radiation to form a cured adhesive composition layer.

13. The method of claim 12, wherein at least one of the first substrate and the second substrate has at least one feature and wherein forming the laminate comprises flowing the curable adhesive composition to cover an outer surface of the feature.

14. The method of claim 12, wherein the curable adhesive composition layer is cut with a die to have dimensions suitable for positioning between the first substrate and the second substrate.

* * * * *

UNITED STATES PATENT AND TRADEMARK OFFICE
CERTIFICATE OF CORRECTION

| | |
|---|---|
| PATENT NO. | : 10,941,321 B2 |
| APPLICATION NO. | : 15/761997 |
| DATED | : March 9, 2021 |
| INVENTOR(S) | : Behling et al. |

Page 1 of 2

It is certified that error appears in the above-identified patent and that said Letters Patent is hereby corrected as shown below:

In the Specification

Column 1
Line 5, Delete "APPLICATION" and insert -- APPLICATIONS --, therefor.

Column 9
Lines 37-39, Delete "This can increase the compatibility of this monomer with the (meth)acrylamide used to form the second monomeric units." and insert the same on Column 9 Line 36, after "atoms." as a continuation of the same paragraph.

Column 17
Line 35, Delete "-1-" and insert -- -4- --, therefor.
Line 36, Delete "USA)," and insert -- USA). --, therefor.

Column 20
Line 29, Delete "2(10)" and insert -- $2(10^{-4})$ --, therefor.

Column 24
Line 51, Delete "f" and insert -- of --, therefor.

Column 26
Line 22, Delete "(c.a.," and insert -- (e.g., --, therefor.

In the Claims

Column 43
Line 22, In Claim 1, delete "an optional" and insert -- a --, therefor.
Line 63, In Claim 1, delete "methyl:" and insert -- methyl; --, therefor.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*

Column 44
Line 28, In Claim 1, delete "(meth) acryloyl" and insert -- (meth)acryloyl --, therefor.

Column 45
Line 7, In Claim 3, after "from" delete "an acidic monomer,".
Line 8, In Claim 3, delete "monomer," and insert -- monomer --, therefor.